US012483776B2

(12) United States Patent
Zhu et al.

(10) Patent No.: US 12,483,776 B2
(45) Date of Patent: Nov. 25, 2025

(54) PHOTOGRAPHING METHOD AND ELECTRONIC DEVICE

(71) Applicant: HONOR DEVICE CO., LTD., Shenzhen (CN)

(72) Inventors: Shiyu Zhu, Shenzhen (CN); Yonghua Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/033,680

(22) PCT Filed: Aug. 26, 2022

(86) PCT No.: PCT/CN2022/115160
§ 371 (c)(1),
(2) Date: Apr. 25, 2023

(87) PCT Pub. No.: WO2023/093169
PCT Pub. Date: Jun. 1, 2023

(65) Prior Publication Data
US 2024/0187725 A1 Jun. 6, 2024

(30) Foreign Application Priority Data
Nov. 25, 2021 (CN) .......................... 202111417773.6
Dec. 1, 2021 (CN) .......................... 202111460029.4

(51) Int. Cl.
*H04N 23/63* (2023.01)
*G06V 10/44* (2022.01)
(Continued)

(52) U.S. Cl.
CPC ........... *H04N 23/632* (2023.01); *G06V 10/44* (2022.01); *G06V 40/161* (2022.01); *G06V 40/28* (2022.01);
(Continued)

(58) Field of Classification Search
CPC .... H04N 23/632; H04N 23/611; H04N 23/62; H04N 23/667; H04N 5/2624;
(Continued)

(56) References Cited

U.S. PATENT DOCUMENTS 10,057,483 B2   8/2018   Her et al.
11,600,116 B2   3/2023   Zu
(Continued)

FOREIGN PATENT DOCUMENTS

CN   103257811 A   8/2013
CN   106990841 A   7/2017
(Continued)

*Primary Examiner* — Nhan T Tran
(74) *Attorney, Agent, or Firm* — WOMBLE BOND DICKINSON (US) LLP

(57) ABSTRACT

A photographing method is disclosed. By implementing the method, an electronic device 100, for example, a mobile phone, may determine bone points of a hand of a user in an image by using a bone point recognition algorithm, and determine two gesture feature points from the bone points. Then the electronic device 100 may construct, by using positions of the two gesture feature points on a horizontal coordinate axis, a gesture vector representing a state of the hand (a palm or the back of the hand). Further, the electronic device 100 may determine a gesture vector of a subsequent image frame by using the same method. When recognizing that a direction of the gesture vector in the subsequent image frame is opposite to a direction of a gesture vector in an initial image frame, the electronic device 100 may determine that the user has made a hand flip gesture.

19 Claims, 23 Drawing Sheets

(51) Int. Cl.
  *G06V 40/16* (2022.01)
  *G06V 40/20* (2022.01)
  *H04N 23/611* (2023.01)
  *H04N 23/62* (2023.01)
  *H04N 23/667* (2023.01)
(52) U.S. Cl.
  CPC .......... *H04N 23/611* (2023.01); *H04N 23/62* (2023.01); *H04N 23/667* (2023.01)
(58) Field of Classification Search
  CPC ...... H04N 23/60; H04N 23/631; H04N 23/90; H04N 23/45; G06V 10/44; G06V 40/161; G06V 40/28; G06F 2203/04803; G06F 3/017
  See application file for complete search history.

(56) References Cited

U.S. PATENT DOCUMENTS

| | | | | |
|---|---|---|---|---|
| 2012/0281129 A1* | 11/2012 | Wang | .................... | H04N 23/611 348/333.01 |
| 2013/0222232 A1* | 8/2013 | Kong | .................... | G06F 3/0304 345/156 |
| 2014/0119596 A1* | 5/2014 | Chang | .................... | G06V 40/20 382/103 |
| 2014/0198031 A1* | 7/2014 | Xiong | .................... | G06V 40/113 382/103 |
| 2014/0211047 A1* | 7/2014 | Lee | .................... | H04N 23/62 348/240.99 |
| 2015/0215576 A1* | 7/2015 | Pavlov | .................... | G06F 3/04886 348/14.03 |
| 2015/0229837 A1* | 8/2015 | Her | .................... | H04N 23/611 348/222.1 |
| 2018/0275764 A1 | 9/2018 | Lee et al. | | |
| 2020/0225758 A1 | 7/2020 | Tang et al. | | |
| 2020/0301514 A1* | 9/2020 | Zhao | .................... | G06F 3/017 |
| 2021/0294423 A1* | 9/2021 | Zhou | .................... | G06F 3/017 |

FOREIGN PATENT DOCUMENTS

| | | |
|---|---|---|
| CN | 107589850 A | 1/2018 |
| CN | 107885446 A | 4/2018 |
| CN | 110096153 A | 8/2019 |
| CN | 110458059 A | 11/2019 |
| CN | 110765974 A | 2/2020 |
| CN | 110798615 A | 2/2020 |
| CN | 110956124 A | 4/2020 |
| CN | 112527107 A | 3/2021 |
| EP | 2908217 A1 | 8/2015 |
| JP | 2020118024 A | 8/2020 |
| KR | 101563298 B1 | 10/2015 |
| WO | 2021208253 A1 | 10/2021 |

* cited by examiner

Flip from a palm to a back of a hand:

Flip from a back to a palm of a hand:

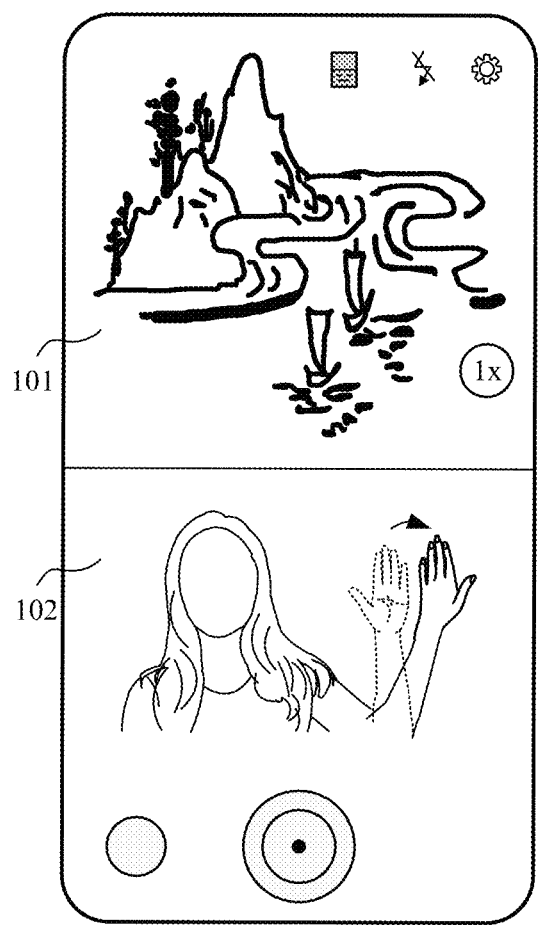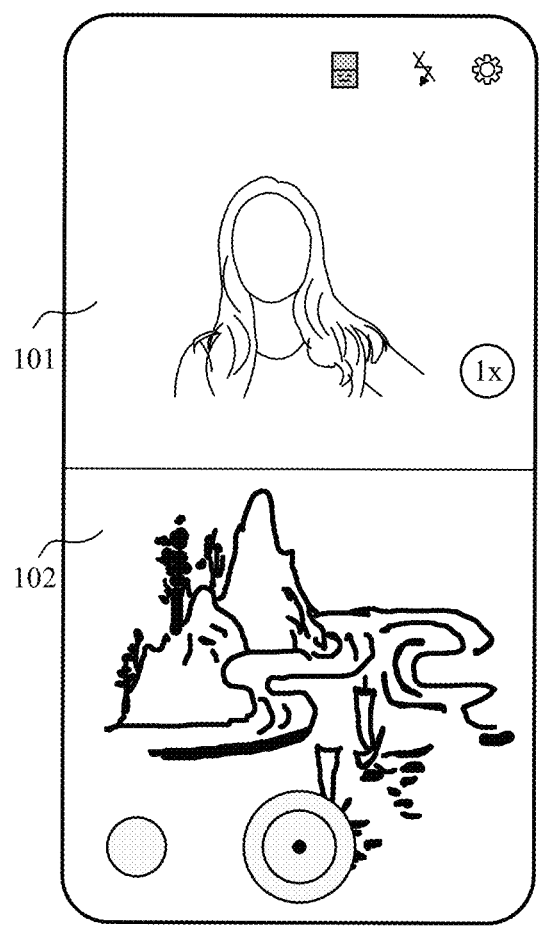
FIG. 3A
FIG. 3B

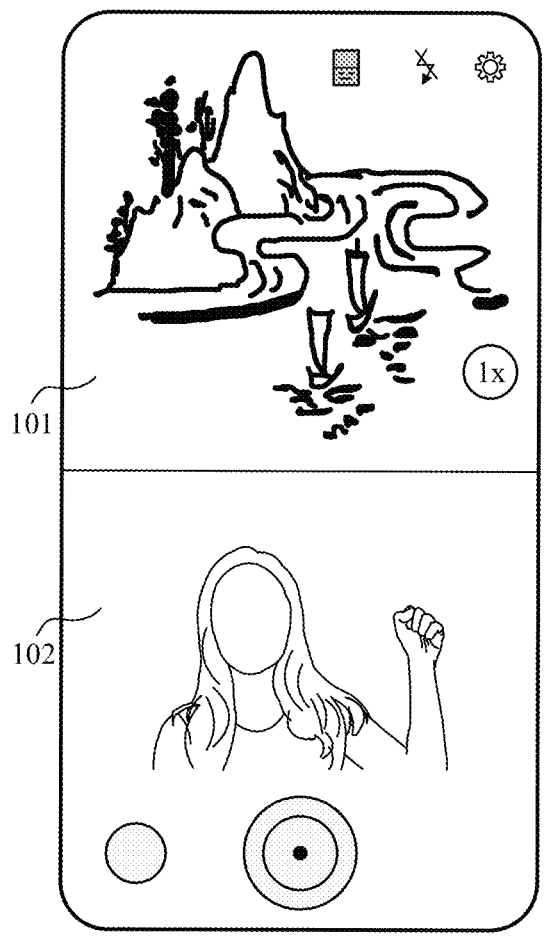
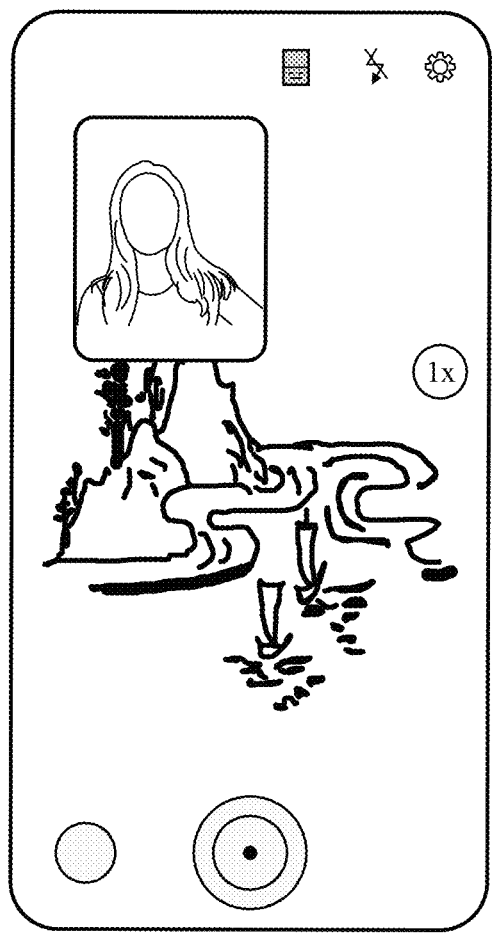
FIG. 6A
FIG. 6B

PHOTOGRAPHING METHOD AND ELECTRONIC DEVICE

CROSS-REFERENCE TO RELATED APPLICATIONS

This application is a national stage of International Application No. PCT/CN2022/115160, filed on Aug. 26, 2022, which claims priorities to Chinese Patent Application No. 202111417773.6, filed on Nov. 25, 2021, and Chinese Patent Application No. 202111460029.4, filed on Dec. 1, 2021, both of which are incorporated herein by references in their entireties.

TECHNICAL FIELD

This application relates to the terminal field, and in particular, to a photographing method and an electronic device.

BACKGROUND

An electronic device, for example, a mobile phone, provides a plurality of photographing modes. A user may select, in different scenarios, a photographing mode suitable for a current scenario to enjoy better photographing experience. However, in an existing process of switching a photographing mode, the user needs to tap a control on a screen to complete switching. The method for switching a photographing mode by tapping the screen by the user is inconvenient for the user.

SUMMARY

This application provides a photographing method. By implementing the method, an electronic device may recognize a gesture made by a user, and control switching of a photographing mode based on the gesture, to improve photographing experience of the user.

According to a first aspect, an embodiment of this application provides a photographing method. The method may be applied to an electronic device. The electronic device includes a first camera and a second camera. The method includes: displaying a first interface, where the first interface includes a first preview window, and the first preview window displays an image collected by the first camera in real time; detecting a first gesture of a user; and displaying a second interface in response to the first gesture, where the second interface includes a second preview window, and the second preview window displays an image collected by the second camera in real time. The detecting a first gesture of a user includes: collecting a first image, where the first image is an image collected by the first camera or the second camera, and the first image includes a first hand image; determining a first gesture vector, where the first gesture vector is determined based on the first hand image; collecting a second image, where the second image is an image collected by the first camera or the second camera, and the second image includes a second hand image; determining a second gesture vector, where the second gesture vector is determined based on the second hand image; and determining the first gesture based on the first gesture vector and the second gesture vector.

By implementing the method provided in the first aspect, the electronic device may control switching between different photographing modes based on the recognized gesture of the user. The electronic device may determine a state of a hand of the user based on the gesture vectors of the hand images in two images, and then compare states of hands in the two images to determine whether the user has made a preset gesture.

With reference to the embodiment provided in the first aspect, in some embodiments, the first gesture vector includes first direction information, the second gesture vector includes second direction information, both the first direction information and the second direction information are used to identify a hand state, and the determining the first gesture based on the first gesture vector and the second gesture vector includes: determining the first gesture based on the first direction information and the second direction information.

By implementing the method provided in the foregoing embodiment, the electronic device may determine, based on directions of the gesture vectors of the hand images in two images, that the hand of the user is flipped.

With reference to the embodiment provided in the first aspect, in some embodiments, the determining the first gesture based on the first direction information and the second direction information includes: when the first direction information and the second direction information are different, determining that the first gesture is a hand flip gesture.

By implementing the method provided in the foregoing embodiment, when recognizing that the directions of the gesture vectors of the hand images in the two images are different, the electronic device may determine that it is recognized that the state of the hand in the images is flipped, and therefore the electronic device may determine that the user has made a hand flip gesture.

With reference to the embodiment provided in the first aspect, in some embodiments, the first interface further includes a third preview window, the third preview window displays an image collected by the second camera in real time, and a third interface is displayed in response to the first gesture, where on the third interface, the first preview window displays the image collected by the second camera in real time, and the third preview window displays the image collected by the first camera in real time.

By implementing the method provided in the foregoing embodiment, after recognizing the hand flip gesture, the electronic device may change images displayed in different preview windows in a dual-scene photographing scenario.

With reference to the embodiment provided in the first aspect, in some embodiments, the determining a first gesture vector specifically includes: recognizing a first feature point and a second feature point in the first hand image; and determining the first gesture vector based on positions of the first feature point and the second feature point on a first coordinate axis, where the first coordinate axis is parallel to the ground; and the determining a second gesture vector specifically includes: recognizing a first feature point and a second feature point in the second hand image; and determining the second gesture vector based on positions of the first feature point and the second feature point on the first coordinate axis.

By implementing the method provided in the foregoing embodiment, the electronic device may construct the gesture vector by using two specific points in the hand image, and then determine the gesture vector representing the state of the hand in the hand image.

With reference to the embodiment provided in the first aspect, in some embodiments, the first direction information of the first gesture vector is a direction of a first coordinate pointing to a second coordinate, where the first coordinate is a projected point of the first feature point in the first hand image on the first coordinate axis, and the second coordinate is a projected point of the second feature point in the first hand image on the first coordinate axis; and the second direction information of the second gesture vector is a direction of a third coordinate pointing to a fourth coordinate, where the third coordinate is a projected point of the first feature point in the second hand image on the first coordinate axis, and the fourth coordinate is a projected point of the second feature point in the second hand image on the first coordinate axis.

By implementing the method provided in the foregoing embodiment, the electronic device may determine the coordinates of the first feature point and the second feature point by using a horizontal coordinate axis, and then determine the first gesture vector and the second gesture vector by using the coordinates.

With reference to the embodiment provided in the first aspect, in some embodiments, the recognizing a first feature point and a second feature point in the first hand image specifically includes: recognizing a first quantity of bone points of a palm in the first hand image; and determining the first feature point and the second feature point based on the first quantity of bone points, where the first feature point and the second feature point are respectively located on two sides of a central axis of the palm in the first hand image.

By implementing the method provided in the foregoing embodiment, the electronic device may determine, by using a bone point detection method, the feature points representing the state of the hand in the hand image.

With reference to the embodiment provided in the first aspect, in some embodiments, the determining the first feature point and the second feature point based on the first quantity of bone points includes: selecting two bone points from the first quantity of bone points as the first feature point and the second feature point; or selecting a plurality of bone points from the first quantity of bone points, and calculating the first feature point and the second feature point by using the plurality of bone points.

By implementing the method provided in the foregoing embodiment, the electronic device may select the first feature point and the second feature point from the plurality of recognized bone points, or calculate the first feature point and the second feature point based on some or all of the plurality of bone points.

With reference to the embodiment provided in the first aspect, in some embodiments, the first feature point is a bone point at the top of a thumb, and the second feature point is a bone point at the top of a little finger.

With reference to the embodiment provided in the first aspect, in some embodiments, before the determining a second gesture vector, the method further includes: recognizing a region in which the second hand image is located in the second image; and determining an intersection over union (IoU) between the region in which the second hand image is located in the second image and a region in which the first hand image is located in the first image; and the determining a second gesture vector includes: determining the second gesture vector of the second hand image in the second image when the IoU meets a first threshold.

By implementing the method provided in the foregoing embodiment, the electronic device may further calculate the intersection over union between the second hand image in the second image and the first hand image before calculating the second gesture vector of the second image. When the intersection over union does not meet a preset condition, the electronic device may determine in advance that the image frame does not conform to a feature of a hand flip gesture, and therefore obtain another image for determining.

With reference to the embodiment provided in the first aspect, in some embodiments, the determining an intersection over union (IoU) between regions in which hands are located in the second image and the first image includes: determining an intersection and a union between the region in which the second hand image is located in the second image and the region in which the first hand image is located in the first image, where the IoU is a ratio of the intersection to the union.

With reference to the embodiment provided in the first aspect, in some embodiments, the recognizing a region in which the second hand image is located in the second image includes: determining a region in which a face is located in the second image; determining a first region based on the region in which the face is located, where the first region includes and is larger than the region in which the face is located, and the first region is smaller than the second image; and recognizing a region in which the hand is located in the first region, and determining that the region in which the hand is located is the region in which the second hand image is located.

By implementing the method provided in the foregoing embodiment, the electronic device can more accurately locate the hand image in the image based on facial recognition and body recognition.

With reference to the embodiment provided in the first aspect, in some embodiments, the method further includes: determining that a length of the second gesture vector meets a second threshold; and the when the first direction information and the second direction information are different, determining that the first gesture is a hand flip gesture includes: when the first direction information and the second direction information are different and the length of the second gesture vector meets the second threshold, determining that the first gesture is a hand flip gesture.

By implementing the method provided in the foregoing embodiment, the electronic device may limit a palm flip angle in the hand flip gesture, to avoid recognizing a waving action unintentionally made by the user as a hand flip gesture, thereby improving accuracy of gesture recognition.

With reference to the embodiment provided in the first aspect, in some embodiments, before the detecting a first gesture of a user, the method further includes: detecting a first operation; and starting photographing in response to the first operation.

By implementing the method provided in the foregoing embodiment, the electronic device may recognize a gesture of the user and switch a photographing mode in a video recording process, so that a photographing process after the switching better meets a requirement of the user or a requirement of a current photographing scenario, thereby improving user experience.

With reference to the embodiment provided in the first aspect, in some embodiments, the first operation includes: an operation acting on a first control, where the first control is displayed on the first interface; or an operation of recognizing that the user has made a second gesture, where the second gesture corresponds to the first control.

By implementing the method provided in the foregoing embodiment, the electronic device may start photographing by using a control acting on a user interface, or may start photographing by recognizing a specific gesture for controlling photographing.

With reference to the embodiment provided in the first aspect, in some embodiments, the first camera is a front-facing camera, and the second camera is a rear-facing camera; or the first camera is a front-facing camera, and the second camera is a front-facing camera; or the first camera is a rear-facing camera, and the second camera is a rear-facing camera.

By implementing the method provided in the foregoing embodiment, cameras used by the electronic device to implement dual-scene or multi-scene photographing may be a front-facing camera and a rear-facing camera, or may be both front-facing cameras or both rear-facing cameras.

According to a second aspect, this application provides an electronic device. The electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method described in any one of the first aspect or the possible implementations of the first aspect.

According to a third aspect, this application provides a computer-readable storage medium, including instructions. When the instructions are run on an electronic device, the electronic device is enabled to perform the method described in any one of the first aspect or the possible implementations of the first aspect.

According to a fourth aspect, this application provides a computer program product including instructions. When the computer program product is run on an electronic device, the electronic device is enabled to perform the method described in any one of the first aspect or the possible implementations of the first aspect.

It can be understood that the electronic device provided in the second aspect, the computer storage medium provided in the third aspect, and the computer program product provided in the fourth aspect are all configured to perform the method provided in the first aspect of this application. Therefore, for beneficial effects that can be achieved by the electronic device, the computer storage medium, and the computer program product, refer to the beneficial effects in the corresponding method. Details are not described herein again.

BRIEF DESCRIPTION OF DRAWINGS

FIG. 3A to FIG. 3F show a group of user interfaces for recognizing a hand flip gesture to switch to a dual-scene photographing mode according to an embodiment of this application;

FIG. 6A and FIG. 6B show a group of user interfaces for recognizing a first gesture to switch to a dual-scene photographing mode according to an embodiment of this application;

DESCRIPTION OF EMBODIMENTS

Terms used in the following embodiments of this application are merely intended to describe specific embodiments, but not to limit this application.

An electronic device, for example, a mobile phone, provides a plurality of photographing modes. A user may select, in different scenarios, a photographing mode suitable for a current scenario to enjoy better photographing experience. However, in an existing process of switching a photographing mode, the user needs to tap a control on a screen to complete switching. The method for switching a photographing mode by tapping the screen by the user is inconvenient for the user.

To enable a user to conveniently switch a photographing mode during video recording, an embodiment of this application provides a photographing method, which relates to a method for switching a photographing mode during preview or video recording. A photographing method is provided through implementation of this embodiment of this application. A terminal electronic device (an electronic device 100), for example, a smartphone or a smart television, may recognize a specific gesture made by a user when displaying a preview image or recording a video. After determining that the specific gesture is recognized, the electronic device 100 may switch a photographing mode (for example, switch from front-facing photographing to rear-facing photographing, or switch from dual-camera photographing to single-camera photographing) based on a type of the recognized gesture. The method of this application is not only applicable to a preview stage during video recording or photo taking, but also applicable to a photographing stage in a video recording process after video recording starts.

In this embodiment of this application, the photographing mode refers to different combinations and display types when the electronic device 100 turns on a plurality of cameras for multi-scene photographing, including a mode of photographing by using a plurality of rear-facing cameras, a mode of photographing by using a front-facing camera and a rear-facing camera, and a mode of photographing by using a plurality of front-facing cameras; or including a photographing mode of different combinations of the foregoing plurality of cameras, and mode switching between single cameras; or including switching between single-camera photographing modes, for example, switching from a front-facing camera to a rear-facing camera.

The specific gesture includes a hand flip gesture. First, FIG. 1 shows a schematic diagram of a hand flip gesture as an example.

Figure 1:
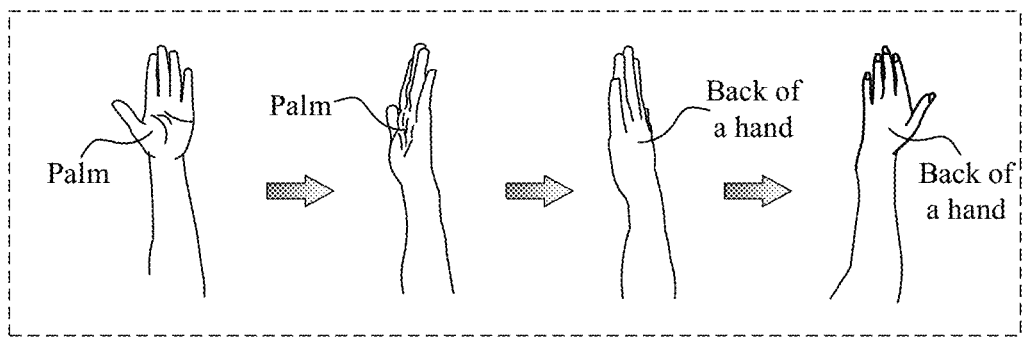
FIG. 1 is a schematic diagram of a group of hand flip gestures according to an embodiment of this application.
Figure 1:
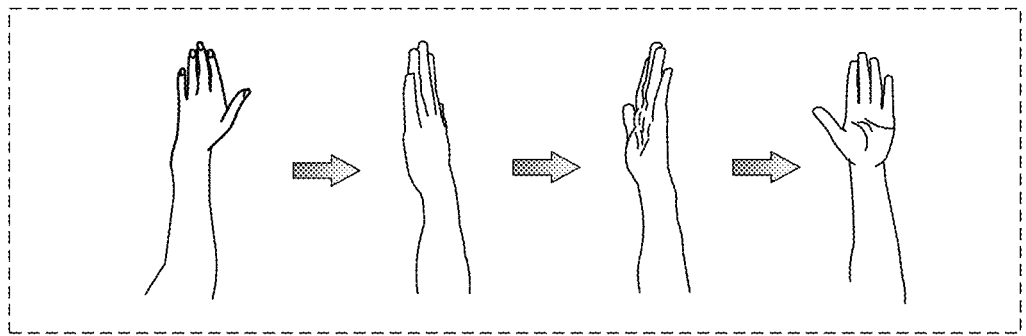

In this embodiment of this application, as shown in FIG. 1, the hand flip gesture is raising a hand and turning a forearm, so that the hand changes from a form of a palm facing a camera of the electronic device 100 to a form of the back of the hand facing the camera of the electronic device 100, or from a form of the back of the hand facing the camera of the electronic device 100 to a form of the palm facing the camera of the electronic device 100. The palm and the back of the hand are a palm of a hand with five fingers stretched and the back of the hand with five fingers stretched. Subsequent embodiments are mainly described using a hand flip process of "flipping from the palm to the back of the hand" as an example.

The electronic device 100 is an electronic device that can collect images and has an image processing capability. When the palm of the hand faces the electronic device 100, image content displayed in an image frame collected by the electronic device 100 is the palm of the hand; or when the back of the hand faces the electronic device 100, image content displayed in an image frame collected by the electronic device 100 is the back of the hand.

In some existing gesture recognition methods, recognizing, by the electronic device 100, the hand flip gesture shown in FIG. 1 depends on an image feature-based deep learning algorithm or machine learning algorithm.

When the foregoing method is used, the electronic device 100 usually needs to learn a large quantity of images including the hand flip gesture, to obtain a model that can recognize the hand flip gesture, and then recognize, based on the model, whether other images include the hand flip gesture. The method for implementing gesture recognition by using the deep learning algorithm or the machine learning algorithm depends on the hand flip gesture recognition model obtained through training. Calculation costs and time costs of generating and using the model are high. In a process of recognizing a gesture of a user by using the foregoing method, accuracy of gesture recognition is not high, and recognition efficiency is also low.

A photographing method is provided through implementation of this embodiment of this application. The electronic device 100 may determine bone points of a hand of a user in an image by using an existing bone point recognition algorithm. The electronic device 100 may determine two gesture feature points from the bone points. A gesture vector including the two gesture feature points may be used to represent a state of a hand (for example, a palm, the back of the hand, or a side of the hand) in a current image frame. The state includes: The palm faces the camera of the electronic device 100, or the back of the hand faces the camera of the electronic device 100.

Then the electronic device 100 may determine a gesture vector of a subsequent image frame by using the same method. When recognizing that a direction of the gesture vector in the subsequent image frame is opposite to a direction of a gesture vector in an initial image frame, the electronic device 100 may determine that the state of the hand in the two frames of images has changed, that is, the hand in the image frame has flipped from the palm to the back of the hand, or from the back of the hand to the palm. Therefore, the electronic device 100 may determine that the user has made a hand flip gesture.

Not limited to the smartphone and the smart television, the electronic device 100 may alternatively be a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not particularly limited in this embodiment of this application.

FIG. 2A and FIG. 2B, FIG. 3A to FIG. 3F, FIG. 4A to FIG. 4F, FIG. 5A to FIG. 5F, and FIG. 6A and FIG. 6B show a group of example user interfaces for implementing, by the electronic device 100, a switching method during video recording. With reference to the user interfaces, the following specifically describes a scenario in which the electronic device 100 implements a switching method during video recording according to an embodiment of this application.

Figure 2A:
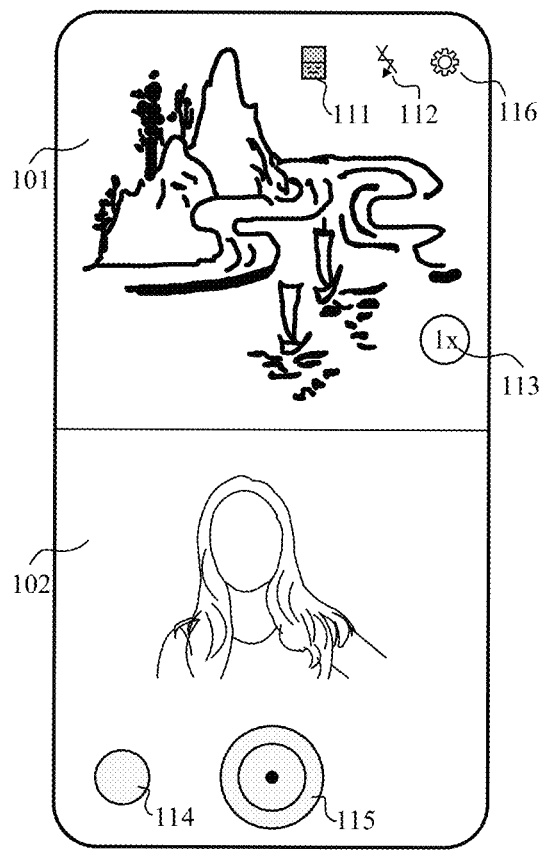
FIG. 2A and FIG. 2B show a group of user interfaces for setting a dual-scene photographing mode according to an embodiment of this application.

First, FIG. 2A shows an example user interface for running a camera application for dual-scene photographing on the electronic device 100. The camera application is an application program that invokes the camera of the electronic device 100 to provide a user with a photo taking or video recording service. The dual-scene photographing means simultaneously invoking a plurality of cameras of the electronic device 100 and displaying images collected by the plurality of cameras on a preview screen, so that the user can record a video including a plurality of views.

As shown in FIG. 2A, the user interface may include a preview window 101 and a preview window 102. The preview window 101 and the preview window 102 may be used to display an image collected by the front-facing or rear-facing camera of the electronic device 100. The preview window may be used to display an image collected by the camera of the electronic device 100 in real time. When detecting a photographing operation (for example, photo taking), the electronic device 100 may save an image displayed in the preview window as a picture; or when detecting a photographing operation (for example, video recording), the electronic device 100 may display a video being recorded in the preview window 101 and/or the preview window 102, and save the video as a video after photographing is stopped. The preview window 101 and/or the preview window 102 (other preview windows are in similar cases) not only display an image collected by the camera during preview, but also display a preview image (that is, an image collected by the camera) during video recording. The preview window mentioned in the method of this application may be a preview window in a preview stage during video recording or photo taking, or may be a preview window in a video recording process after video recording starts (this can be understood as that a control 115 in FIG. 2A is tapped to start photographing, the preview window 101 and the preview window 102 display a preview image in a video recording process, and the control 115 is tapped again to stop photographing).

By default, after entering a dual-scene photographing mode, the electronic device 100 may execute a "front/rear" mode in dual-scene photographing. The "front/rear" mode is a photographing mode in which a front-facing camera and a rear-facing camera of the electronic device 100 are simultaneously invoked for dual-scene photographing, and images collected by the two cameras are equally displayed. As shown in FIG. 2A, in this case, the preview window 101 may display an image collected by the rear-facing camera, and the preview window 102 may display an image collected by the front-facing camera; or the preview window 101 displays an image collected by the front-facing camera, and the preview window 102 displays an image collected by the rear-facing camera.

The user interface shown in FIG. 2A further includes a control 111. The control 111 may be configured to switch a photographing mode of the dual-scene photographing. In addition to the "front/rear" mode described above, the photographing mode further includes "rear/rear", "picture in picture", "front/front", "rear", "front", and other modes.

The "rear/rear" mode is a photographing mode in which two different rear-facing cameras of the electronic device 100 are simultaneously invoked for dual-scene photographing, and images collected by the two cameras are equally displayed. For example, the two different rear-facing cameras are a common rear-facing camera and a wide-angle rear-facing camera. The "picture in picture" mode is a photographing mode in which a front-facing camera and a rear-facing camera of the electronic device 100 are simultaneously invoked for dual-scene photographing, and an image collected by the front-facing camera is embedded into an image collected by the rear-facing camera in a form of a window. For example, in "picture in picture" shown in a window 117 in FIG. 2B, a screen mainly displays scenery collected by the rear-facing camera, and a portrait collected by the front-facing camera is embedded in an upper left corner of the image collected by the rear-facing camera in a form of a small floating window. The "rear" mode is a photographing mode in which a front-facing camera and a rear-facing camera of the electronic device 100 are invoked for dual-scene photographing, but only an image collected by the rear-facing camera is displayed. The "front" mode is a photographing mode in which a front-facing camera and a rear-facing camera of the electronic device 100 are invoked for dual-scene photographing, but only an image collected by the front-facing camera is displayed.

In addition, the user interface may further include a control 112, a control 113, a control 114, the control 115, and a control 116. The control 112 may be configured to control on/off of a flash of the electronic device 100. The control 113 may be configured to adjust a focal length of the front-facing camera. The control 114 may be configured to display a captured photo or a recorded video. The control 115 may be configured to control start/end of dual-scene photographing. The control 116 may be configured to provide the user with more functions for setting photographing parameters. Details are not described herein.

The electronic device 100 may detect a user operation acting on the control 111. For example, the user operation may be a tap operation. In response to the operation, the electronic device 100 may display a user interface shown in FIG. 2B. The window 117 is displayed on the user interface. Photographing modes such as "front/rear" and "rear/rear" are displayed in the window 117. In this case, the electronic device 100 may detect a user operation acting on any photographing mode, and set a currently used dual-scene photographing mode to the photographing mode selected by the user.

Figure 2B:
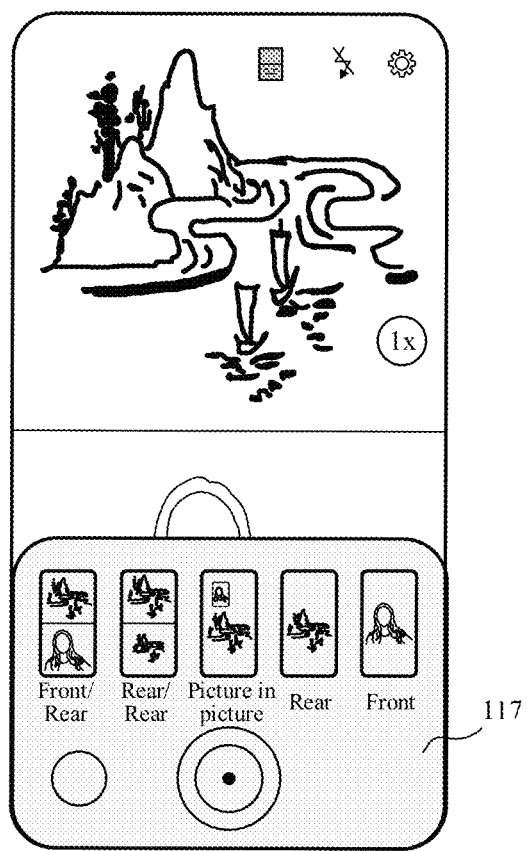

On the user interface shown in FIG. 2A and FIG. 2B, the user needs to perform an operation of tapping the screen in the process of switching the photographing mode of the dual-scene photographing. In most dual-scene photographing scenarios, the method for switching a photographing mode by tapping a screen by a user is inconvenient for the user. To avoid the foregoing problem, in this embodiment of this application, the electronic device 100 may switch between different photographing modes of the dual-scene photographing by recognizing a gesture of the user.

For example, in the photographing scenario shown in FIG. 2A, the user may perform a hand flip gesture to control the electronic device 100 to exchange the images displayed in the preview window 101 and the preview window 102.

Specifically, when the user performs the hand flip gesture, the electronic device 100 may collect an image frame sequence including the gesture. Refer to the preview window 102 in FIG. 3A. In response to recognition of the hand flip gesture, with reference to FIG. 3B, the electronic device 100 may display an image that includes a portrait of the user and that is collected by the front-facing camera in the preview window 101 (the image originally displayed in the preview window 102), and display an image collected by the front-facing camera in the preview window 102 (the image originally displayed in the preview window 101), that is, exchange the images displayed in the preview window 101 and the preview window 102.

Figure 3C:
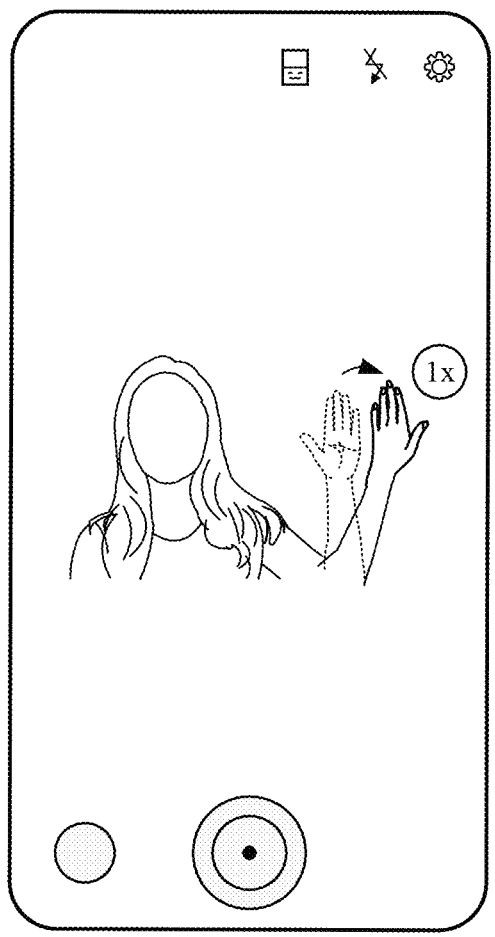
Figure 3D:
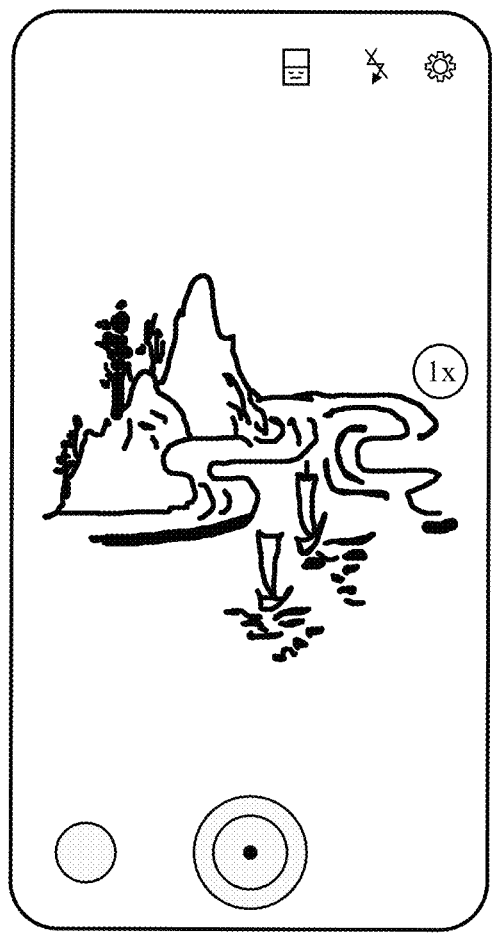

As shown in FIG. 3C and FIG. 3D, in a scenario in which the electronic device 100 is displaying an image collected by the front-facing camera in full screen, when detecting that the user has performed a hand flip gesture, the electronic device 100 may switch the image that is collected by the front-facing camera and that is currently displayed on the screen to an image collected by the rear-facing camera.

On the contrary, in a scenario in which the electronic device 100 is displaying an image collected by the rear-facing camera in full screen, when detecting that the user has performed a hand flip gesture, the electronic device 100 may switch the image that is collected by the rear-facing camera and that is currently displayed on the screen to an image collected by the front-facing camera. In the scenario in which the electronic device 100 is displaying the image collected by the rear-facing camera in full screen, that is, when the image that includes the portrait and that is collected by the front-facing camera is not displayed, the front-facing camera of the electronic device 100 may collect an image and recognize whether the user has performed a hand flip gesture.

Figure 3E:
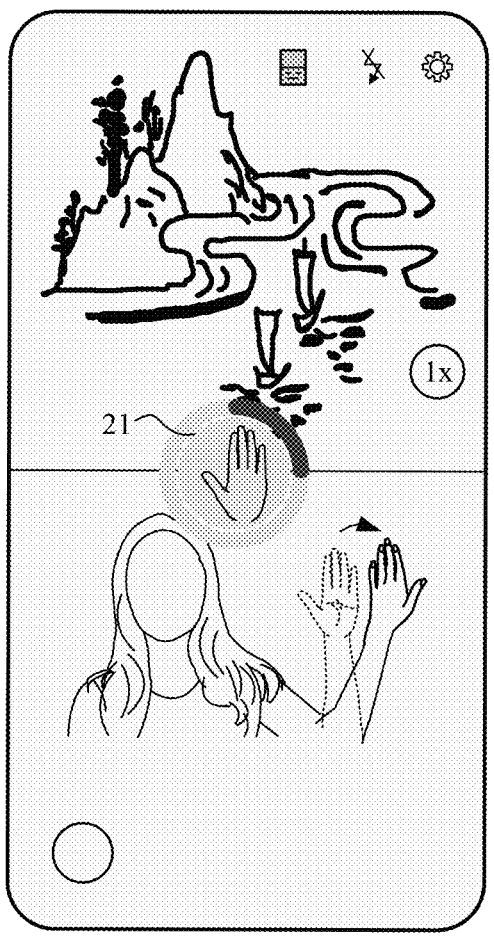

It can be understood that, using FIG. 3A as an example, the electronic device 100 may display a user interface shown in FIG. 3E after detecting that the user raises the palm in the process of recognizing the hand flip gesture of the user in FIG. 3A. The user interface may include a control 21. The control 21 may identify detection of an action of raising the palm by the user. The control 21 includes an annular loading circle. The loading circle may represent a timer. The loading circle may prompt the user to complete a gesture before loading of the loading circle is completed, that is, before end of timing. In this case, the electronic device 100 uses, as an image frame for recognizing a gesture of the user by the electronic device 100, a recognized image frame of the user raising the palm to an image frame collected when the loading of the loading circle is completed.

In some embodiments, the control 21 may alternatively prompt the user to complete a gesture after the loading of the loading cycle is completed. In this case, the electronic device 100 may obtain a video frame within a period of time after the loading of the loading cycle is completed, and use the video frame as an image frame for recognizing a gesture of the user by the electronic device 100. The period of time is preset, and may be generally 3 seconds.

Figure 3F:
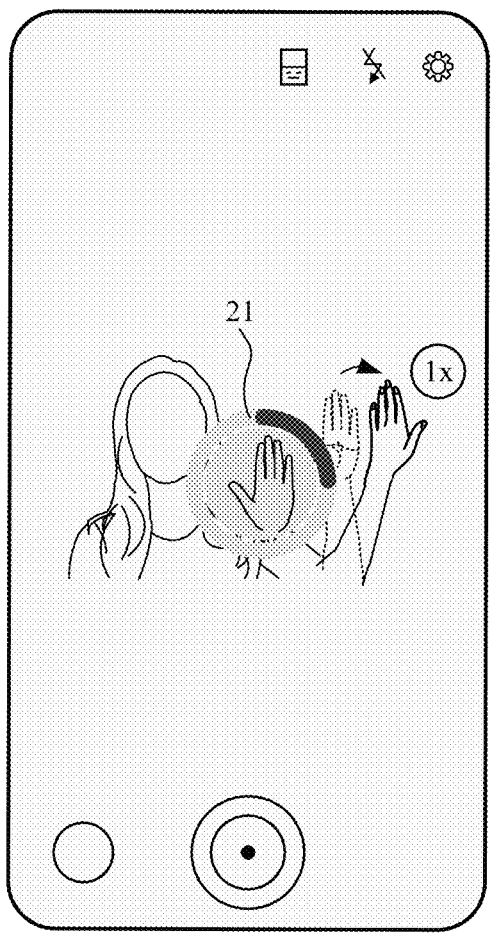

Subsequently, on the user interface shown in FIG. 3C on which it is detected that the user has made a hand flip gesture, the electronic device 100 also displays the control 21 after detecting that the user raises the palm, to prompt the user to complete a gesture, obtains an image frame when the user completes a gesture, and recognizes the gesture completed by the user. Refer to FIG. 3F. Details are not described again in subsequent embodiments.

The electronic device 100 may further recognize a swipe gesture. The swipe gesture includes swiping left and swiping right.

FIG. 4A to FIG. 4F show user interfaces on which the electronic device 100 recognizes a swipe-right gesture of the user to control switching between different photographing modes of dual-scene photographing.

For example, in the photographing scenario shown in FIG. 2A, the user may stretch the palm and swipe right to control the electronic device 100 to close the preview window 102, so as to switch from the "front/rear" mode shown in FIG. 2A to the "front" or "rear" photographing mode.

Figure 4A:
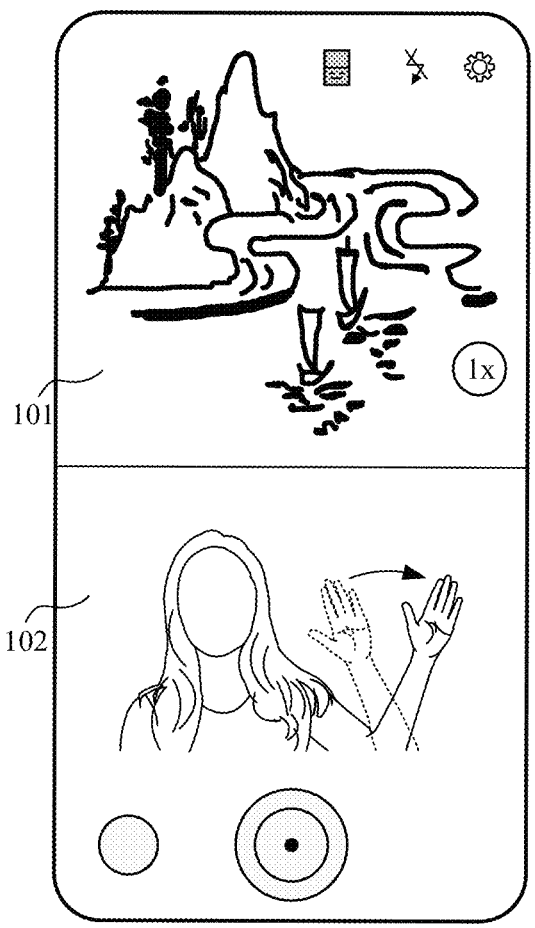
FIG. 4A to FIG. 4F show a group of user interfaces for recognizing a swipe-right gesture to switch to a dual-scene photographing mode according to an embodiment of this application.
Figure 4B:
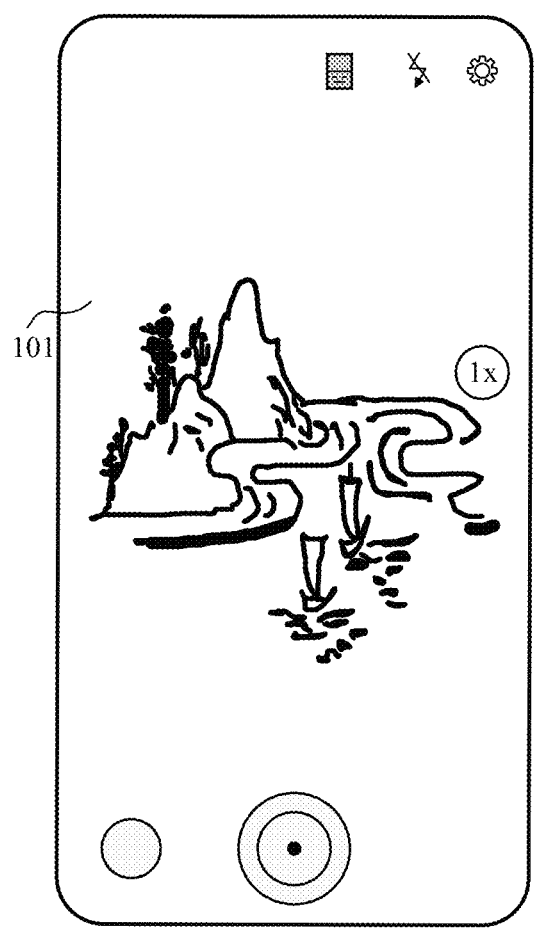

When the user stretches the palm and swipes right, the electronic device 100 may obtain an image frame sequence including the gesture. Refer to the preview window 102 in FIG. 4A. By recognizing the image frame sequence, the electronic device 100 may determine that the user has performed the swipe-right gesture. In response to recognition of the swipe-right gesture, the electronic device 100 may close the preview window 102. Refer to FIG. 4B. In this case, the electronic device 100 may display, in full screen, the image that is collected by the rear-facing camera and that is originally displayed in the preview window 101, that is, switch from the "front/rear" mode shown in FIG. 2A to the "rear" photographing mode.

In a photographing scenario shown in FIG. 4B, the user may perform a swipe-right gesture to control the electronic device 100 to re-display the two preview windows, so as to switch the "rear" mode shown in FIG. 4B to the "front/rear" photographing mode.

Figure 4C:
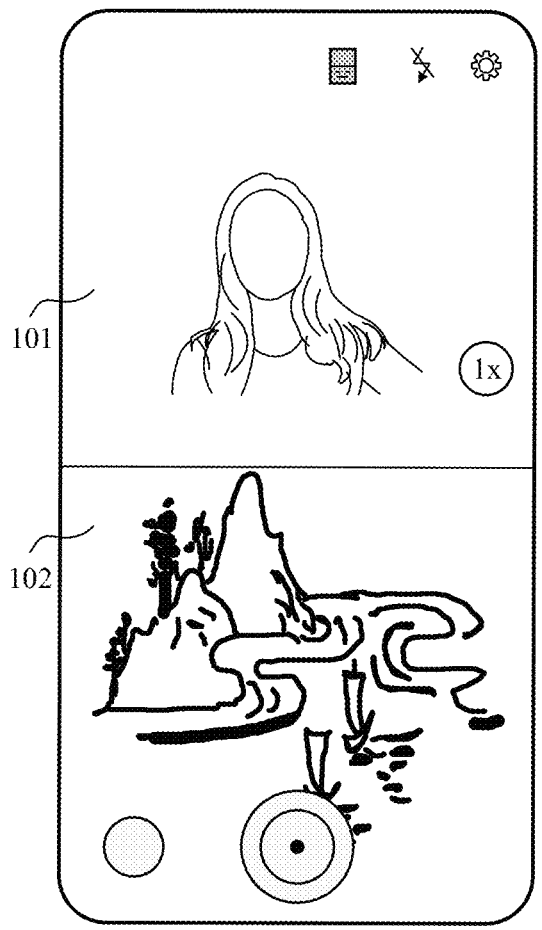

When the electronic device 100 displays a user interface shown in FIG. 4B, that is, when the image that includes the portrait and that is collected by the front-facing camera is not displayed, the front-facing camera of the electronic device 100 may collect an image and recognize whether the user has performed a swipe-right gesture. In response to recognition of a swipe-right gesture performed by the user, the electronic device 100 may re-display the preview window 102, that is, return to the "front/rear" mode of the dual-scene photographing mode. Refer to FIG. 4C. In this case, the preview window 101 may display the image collected by the front-facing camera, and the preview window 102 may display the image collected by the rear-facing camera.

Figure 4D:
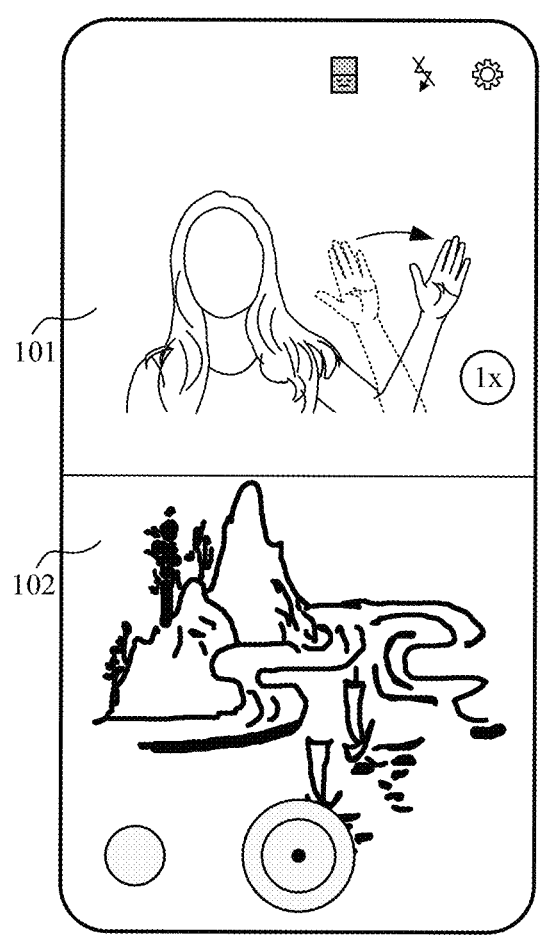
Figure 4E:
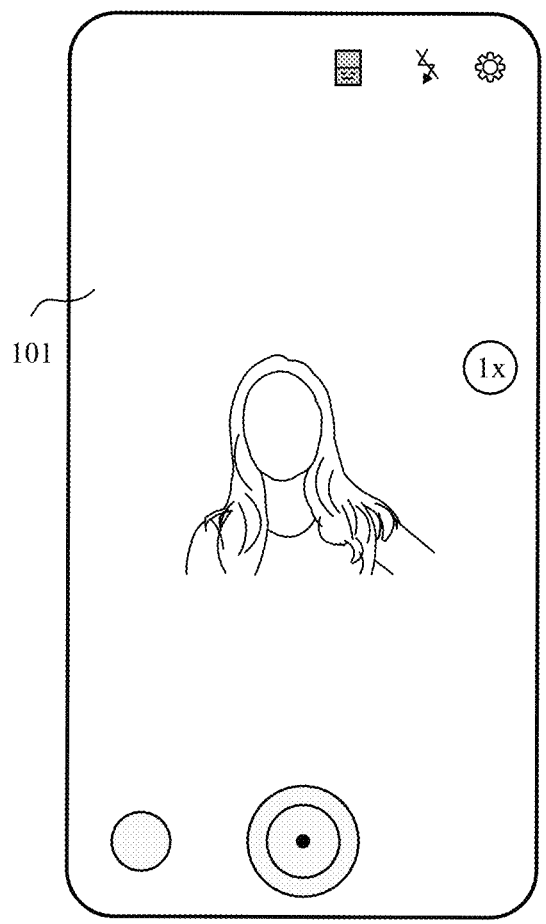

In a photographing scenario shown in FIG. 4C, the electronic device 100 may recognize a swipe-right gesture of the user again. Refer to FIG. 4D. In response to recognition of the swipe-right gesture, the electronic device 100 may close the preview window 102 again. Refer to FIG. 4E. In this case, the electronic device 100 may display, in full screen, the image that is collected by the front-facing camera and that is originally displayed in the preview window 101, that is, switch from the "front/rear" mode shown in FIG. 4D to the "front" mode.

Figure 4F:
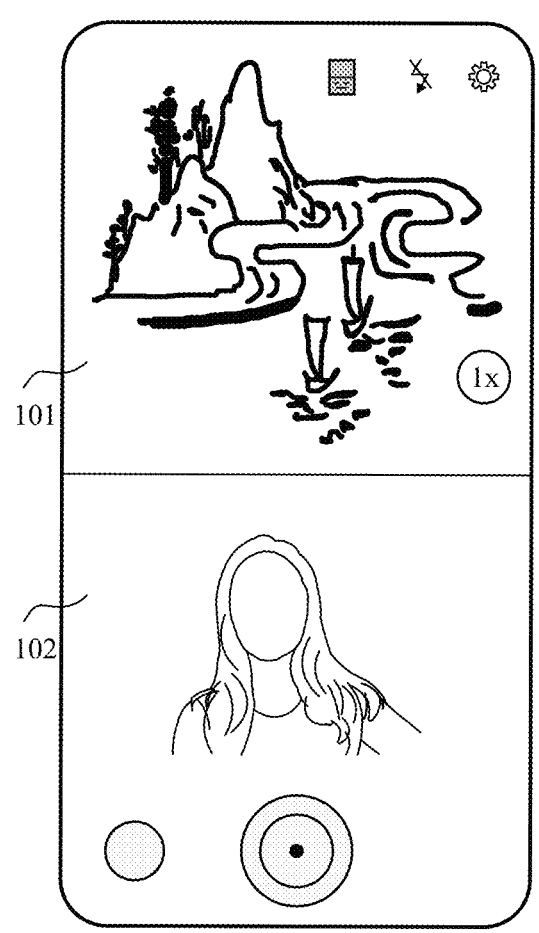

Then, after detecting that the user makes a swipe-right gesture, the electronic device 100 may re-display the preview window 102. Refer to FIG. 4F. In this case, the preview window 101 may display the image collected by the rear-facing camera, and the preview window 102 may display the image collected by the rear-facing camera. In this case, photographing states shown in FIG. 4F and FIG. 4A are the same. To be specific, in a photographing state shown in FIG. 4E, after detecting a swipe-right gesture, the electronic device 100 may return to the "front/rear" mode shown in FIG. 4A, and the preview window 101 displays the image collected by the rear-facing camera, and the preview window 102 displays the image collected by the rear-facing camera.

By analogy, in a process of repeatedly recognizing a swipe-right gesture of the user, the electronic device 100 may repeat the process shown in FIG. 4A to FIG. 4E, so that the user switches the dual-scene photographing mode by using the swipe-right gesture.

The control method shown through repetition of FIG. 4A to FIG. 4E may be summarized as follows: In the "front/rear" mode of up-down split-screen display, each time the electronic device 100 recognizes a swipe-right gesture of the user, the electronic device 100 may close a lower preview window (the preview window 102), to display, in full screen, an image collected by a camera corresponding to an upper preview window (the preview window 101). In the "front" or "rear" photographing mode, each time the electronic device 100 recognizes a swipe-right gesture of the user, the electronic device 100 splits a full-screen preview window into an upper preview window and a lower preview window (the preview window 101 and the preview window 102); displays, in the preview window 102, an image currently displayed in full screen; and displays, in the preview window 101, an image collected by a camera corresponding to the preview window 102 closed in a previous process.

It can be understood that, in the process of recognizing the swipe-right gesture in FIG. 4A to FIG. 4F, the electronic device 100 also displays the control 21 in FIG. 3E after detecting that the user raises the palm, to prompt the user to complete a gesture, obtains an image frame when the user completes a gesture, and recognizes the gesture completed by the user. For the foregoing process, refer to the descriptions of FIG. 3E. Details are not described herein again.

FIG. 5A to FIG. 5F show user interfaces on which the electronic device 100 recognizes a swipe-left gesture of the user to control switching between different photographing modes of dual-scene photographing.

For example, in the photographing scenario shown in FIG. 2A, the user may stretch the palm and swipe left to control the electronic device 100 to close the preview window 101, so as to switch from the "front/rear" mode shown in FIG. 2A to the "front" or "rear" photographing mode.

Figure 5A:
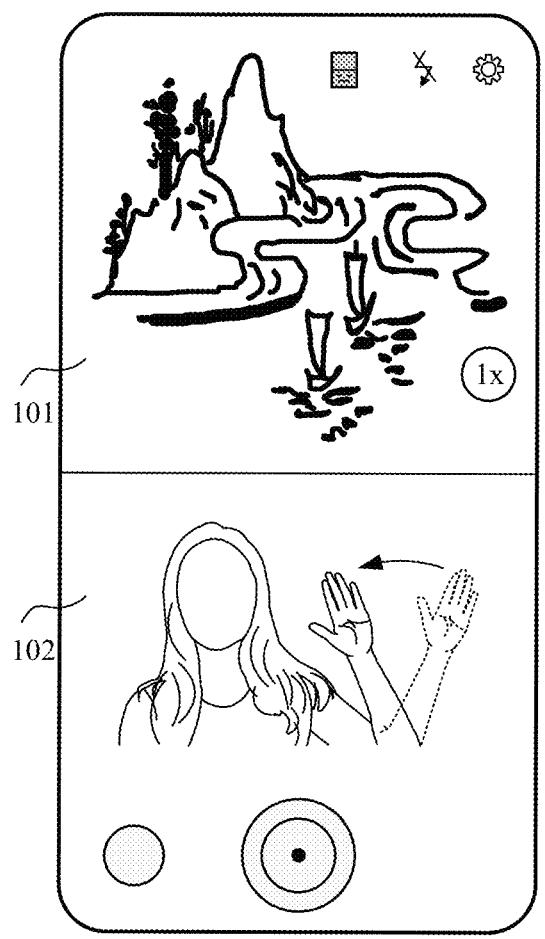
FIG. 5A to FIG. 5F show a group of user interfaces for recognizing a swipe-left gesture to switch to a dual-scene photographing mode according to an embodiment of this application.
Figure 5B:
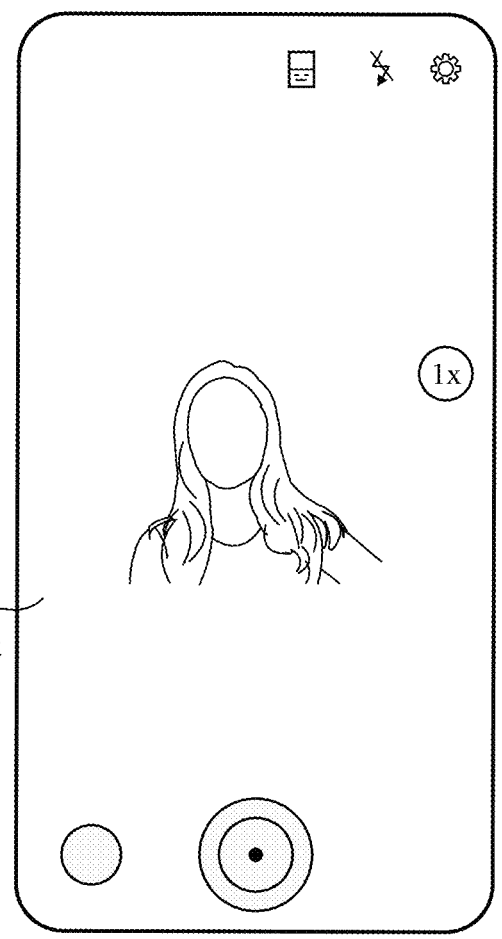

When the user stretches the palm and swipes left, the electronic device 100 may obtain an image frame sequence including the gesture. Refer to the preview window 102 in FIG. 5A. By recognizing the image frame sequence, the electronic device 100 may determine that the user has performed the swipe-left gesture. In response to recognition of the swipe-left gesture, the electronic device 100 may close the preview window 101. Refer to FIG. 5B. In this case, the electronic device 100 may display, in full screen, the image that is collected by the front-facing camera and that is originally displayed in the preview window 102, that is, switch from the "front/rear" mode shown in FIG. 2A to the "front" mode.

In a photographing scenario shown in FIG. 5B, the user may perform a swipe-left gesture to control the electronic device 100 to re-display the two preview windows, so as to switch the "front" mode shown in FIG. 5B to the "front/rear" photographing mode.

Figures 5C, 5D:
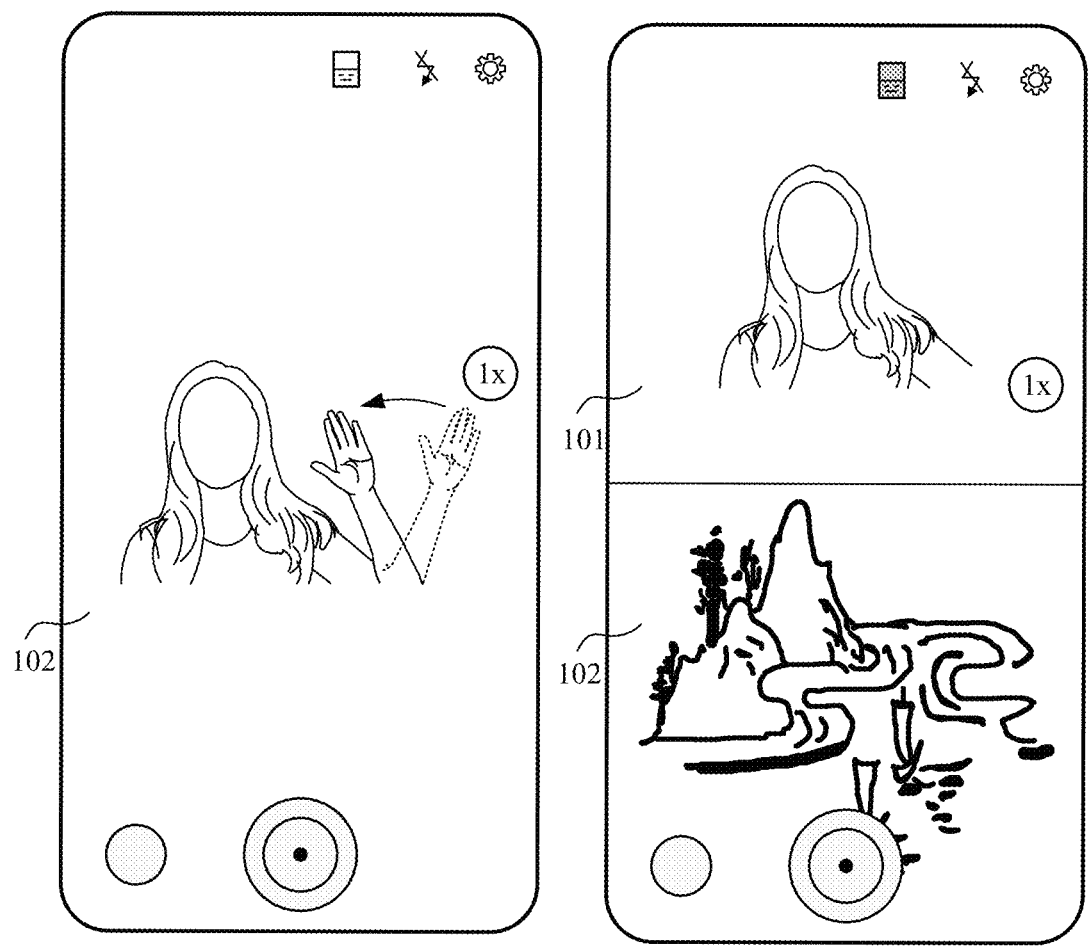

Likewise, when the user performs the swipe-left gesture, the electronic device 100 may collect an image frame sequence including the gesture. Refer to the preview window 102 in FIG. 5C. In response to recognition of the swipe-left gesture, the electronic device 100 may re-display the preview window 101. Refer to FIG. 5D. In this case, the preview window 101 may display the image collected by the front-facing camera, and the preview window 102 may display the image collected by the rear-facing camera.

Figure 5E:
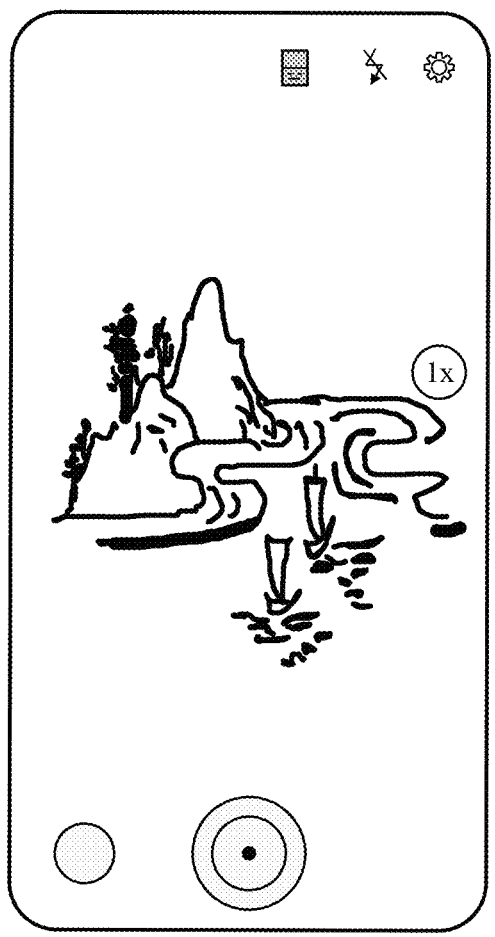

In a photographing scenario shown in FIG. 5D, the electronic device 100 may recognize again that the user has performed a swipe-left gesture. In response to recognition of the swipe-left gesture, the electronic device 100 may close the preview window 101 again. Refer to FIG. 5E. The electronic device 100 may display, in full screen, the image that is collected by the rear-facing camera and that is originally displayed in the preview window 102, that is, switch from the "front/rear" mode shown in FIG. 5D to the "rear" photographing mode. Then, after detecting that the user makes a swipe-left gesture, the electronic device 100 may re-display the preview window 101, that is, return to the "front/rear" dual-scene photographing mode. Refer to FIG. 5A. In this case, the preview window 101 may display the image collected by the rear-facing camera, and the preview window 102 may display the image collected by the rear-facing camera.

Figure 5F:
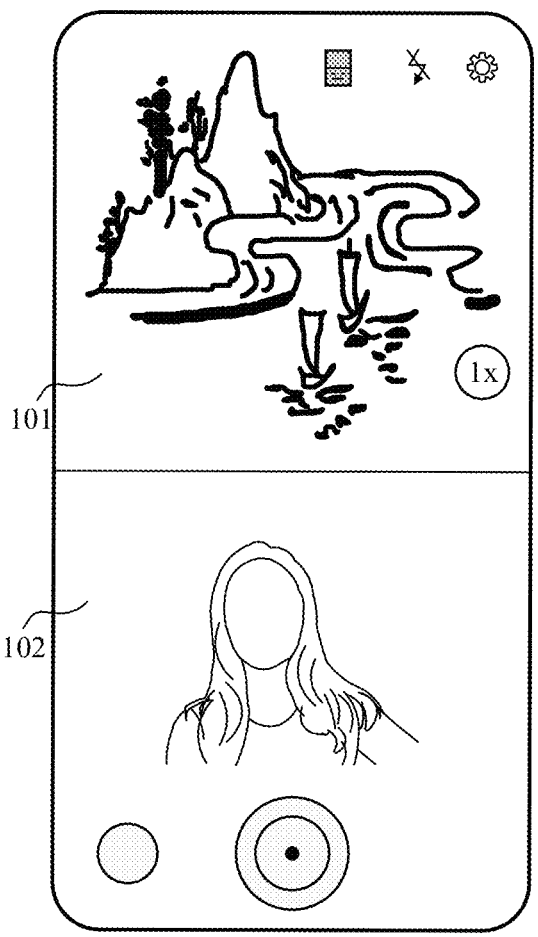

In this case, photographing states shown in FIG. 5F and FIG. 5A are the same. To be specific, in a photographing state shown in FIG. 5E, after detecting a swipe-left gesture, the electronic device 100 may return to the "front/rear" mode shown in FIG. 5A, and the preview window 101 displays the image collected by the rear-facing camera, and the preview window 102 displays the image collected by the rear-facing camera.

It can be understood that, in the scenario shown in FIG. 5E, although the electronic device 100 does not display an image collected by the front-facing camera, the front-facing camera is still in an operating state. The electronic device 100 may recognize an image collected by the front-facing camera. Therefore, in the scenario shown in FIG. 5E, when recognizing that the image collected by the front-facing camera includes a swipe-left gesture, the electronic device 100 may perform switching shown in FIG. 5E and FIG. 5F.

In addition to the front-facing camera, the electronic device 100 may further recognize an image collected by the rear-facing camera. When recognizing that the image collected by the rear-facing camera includes a swipe-left gesture, the electronic device 100 may also perform switching shown in FIG. 5E and FIG. 5F. Alternatively, the front-facing camera and the rear-facing camera of the electronic device 100 may simultaneously collect and recognize images of a plurality of users simultaneously making specific gestures. In this case, the electronic device 100 may control switching of the photographing mode based on a gesture completed earlier among the recognized specific gestures simultaneously made by the plurality of users.

Optionally, the electronic device 100 may determine, based on depths of field of gestures in images obtained by a plurality of cameras, a specific camera, to recognize a gesture in an image obtained by the camera. For example, a depth of field of a hand flip gesture that is made by the user and that is in an image collected by the front-facing camera is usually small, that is, the gesture occupies a large region of the entire image in an image frame. In this case, the electronic device 100 may recognize the gesture in the image frame collected by the front-facing camera, and control switching of the photographing mode based on the recognized gesture.

By analogy, in a process of repeatedly recognizing a swipe-left gesture of the user, the electronic device 100 may repeat the process shown in FIG. 5A to FIG. 5E, so that the user controls switching of the dual-scene photographing mode by using the swipe-left gesture.

The control method shown through repetition of FIG. 5A to FIG. 5E may be summarized as follows: In the "front/rear" mode of up-down split-screen display, each time the electronic device 100 recognizes a swipe-left gesture of the user, the electronic device 100 may close an upper preview window (the preview window 101), to display, in full screen, an image collected by a camera corresponding to a lower preview window (the preview window 102). In the "front" or "rear" photographing mode, each time the electronic device 100 recognizes a swipe-left gesture of the user, the electronic device 100 splits a full-screen preview window into an upper preview window and a lower preview window (the preview window 101 and the preview window 102); displays, in the preview window 101, an image currently displayed in full screen; and displays, in the preview window 102, an image collected by a camera corresponding to the preview window 101 closed in a previous process.

It can be understood that, in the process of recognizing the swipe-left gesture in FIG. 5A to FIG. 5F, the electronic device 100 also displays the control 21 in FIG. 3E after detecting that the user raises the palm, to prompt the user to complete a gesture, obtains an image frame when the user completes a gesture, and recognizes the gesture completed by the user. For the foregoing process, refer to the descriptions of FIG. 3E. Details are not described herein again.

The electronic device 100 may further recognize a first gesture. The first gesture is a gesture that fingers bend towards a center of the palm, so that the palm with five fingers stretched turns into a fist. The fist gesture may be used to control the electronic device 100 to switch to dual-scene photographing in the "picture in picture" mode. FIG. 6A and FIG. 6B show user interfaces on which the electronic device 100 recognizes that the user performs a fist gesture and switches the dual-scene photographing mode to the "picture in picture" mode.

As shown in the photographing scenario shown in FIG. 2A, the user may perform a fist gesture. When the user performs the fist gesture, the electronic device 100 may collect an image frame including the gesture. Refer to the preview window 102 in FIG. 6A. In response to recognition of the fist gesture, with reference to FIG. 6B, the electronic device 100 may embed, in a form of a small window, the image collected by the front-facing camera into the image that is collected by the rear-facing camera and that is displayed in full screen, that is, switch the dual-scene photographing mode to the "picture in picture" mode for viewing by the user.

In addition to the dual-scene photographing modes such as "front/rear", "rear/rear", and "picture in picture" described in the foregoing embodiments, the electronic device 100 may further support other types of dual-scene photographing or multi-scene photographing. Correspondingly, in addition to the gestures such as flipping, swiping right, swiping left, and fisting described in the foregoing embodiment, the electronic device 100 may further recognize other types of gestures. This is not limited in this embodiment of this application.

Figure 7:
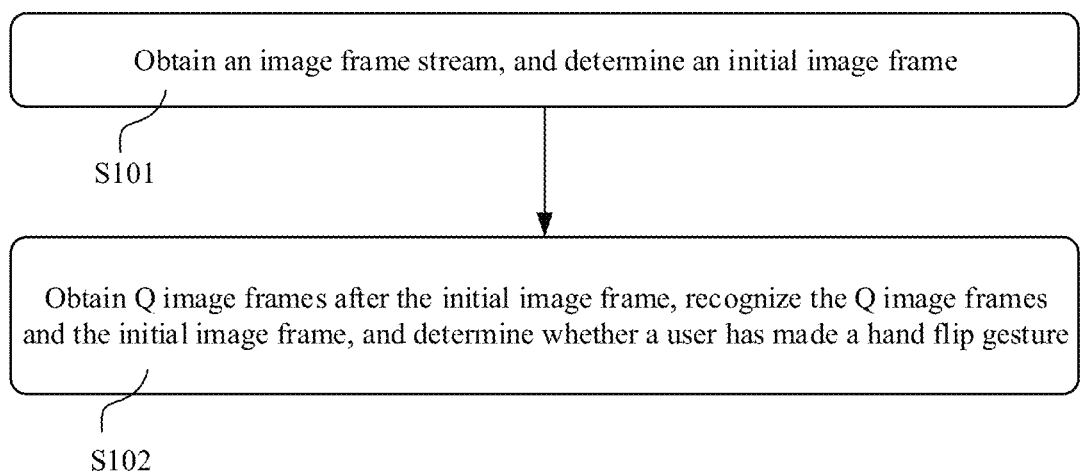
FIG. 7 is a flowchart of recognizing a hand flip gesture by an electronic device according to an embodiment of this application.

The following specifically describes a specific process of recognizing, by the electronic device 100, that the user has made a hand flip gesture. With reference to FIG. 7, the process of recognizing, by the electronic device 100, that the user has made a hand flip gesture may include two parts.

S101: Obtain an image frame stream, and determine an initial image frame.

In a process of invoking a camera to collect an image, first, the electronic device 100 may obtain a series of image frames, that is, an image frame stream, collected by the camera. When the user performs a hand flip gesture, the image frame stream may include a plurality of continuous frames of images of the user completing the hand flip gesture. The electronic device 100 may recognize the plurality of continuous frames of images of the user completing the hand flip gesture to determine that the user has made the hand flip gesture.

First, the electronic device 100 needs to determine the initial image frame from the image frame stream returned from the camera. The initial image frame is the first frame of image, in the image frame stream, that identifies that the user has made the hand flip gesture.

Figure 8A:
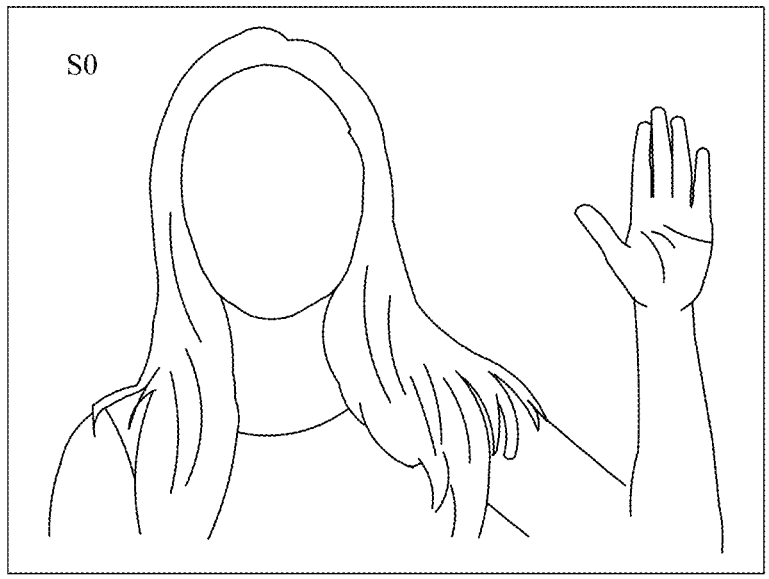
FIG. 8A and FIG. 8B are schematic diagrams of an initial image frame according to an embodiment of this application.

FIG. 8A is an example schematic diagram of the initial image frame. As shown in FIG. 8A, when completing the hand flip gesture, the user first raises the palm and makes the palm face the camera of the electronic device 100, and then the user may turn the palm clockwise or counterclockwise to complete the hand flip gesture. Therefore, after detecting an image frame S0 of the palm facing the camera of the electronic device 100, as shown in FIG. 8A, the electronic device 100 may determine that the image frame S0 shown in FIG. 8A and a plurality of image frames after the image frame S0 may include a hand flip gesture made by the user. Therefore, the electronic device 100 may determine that S0 is the initial image frame.

Figure 8B:
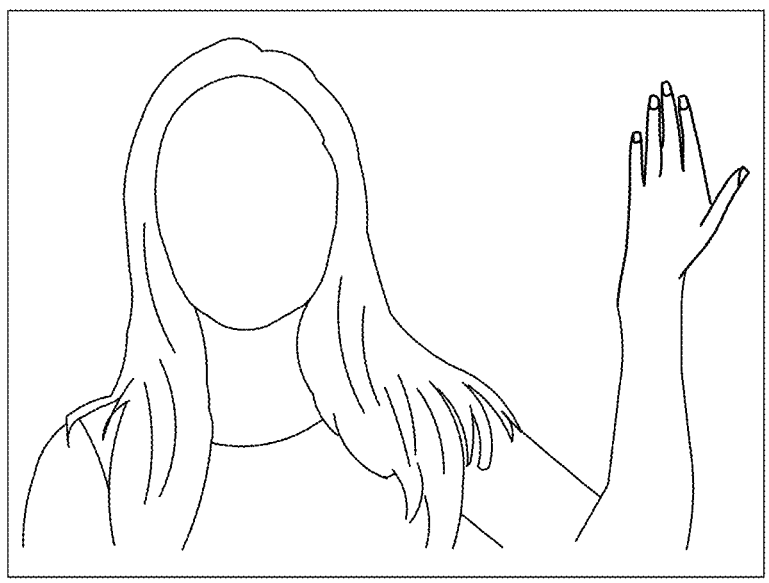

It can be understood that, in a hand flip process of flipping from the back of the hand to the palm, after recognizing an image frame shown in FIG. 8B, the electronic device 100 determines that the image frame shown in FIG. 8B is the initial image frame.

Specifically, in a process of determining the initial image frame from the image frame stream, the electronic device 100 needs to recognize a gesture in an image frame. When an image frame includes a gesture and the gesture is the same as the gesture shown in FIG. 8A, the electronic device 100 may determine that the image frame is the initial image frame.

In some embodiments, the electronic device 100 may determine, by using an existing gesture recognition model, whether an image frame includes a gesture. The gesture recognition model may be a model that records gesture features and that is built by learning, by using an artificial neural network algorithm, massive image frames including gestures. In addition to the artificial neural network algorithm, an algorithm for constructing the gesture recognition model may be alternatively another deep learning algorithm or machine learning algorithm. This is not limited in this embodiment of this application. Based on the foregoing gesture recognition model, the electronic device 100 may determine whether any frame of image includes a gesture.

Figure 9A:
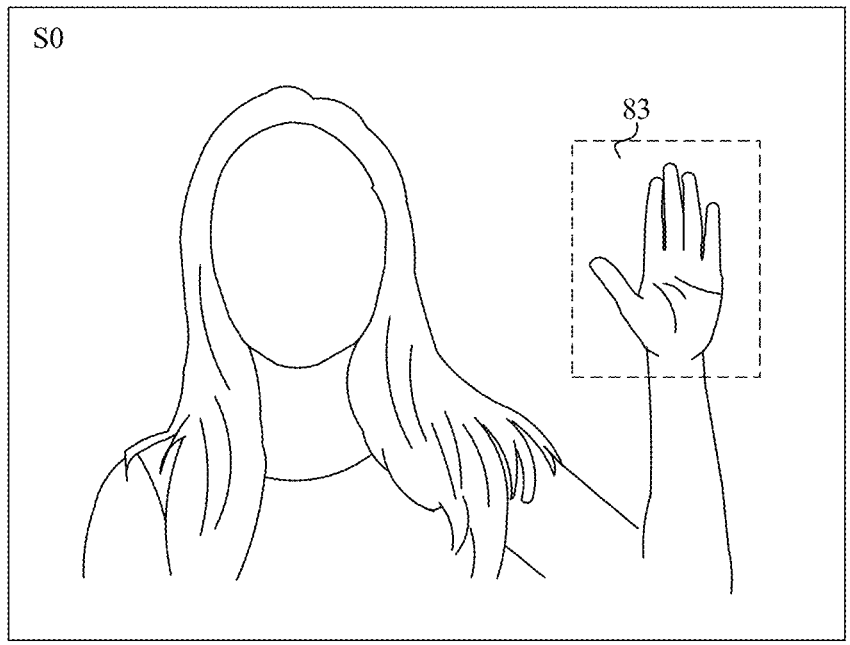
FIG. 9A and FIG. 9B are schematic diagrams of a hand image in a positioning image frame according to an embodiment of this application.

With reference to FIG. 9A, the electronic device 100 may input the image frame S0 in the image frame stream into the gesture recognition model, and then the electronic device 100 may recognize a hand image 83 in S0. The hand image 83 conforms to a gesture feature of start of the hand flip gesture. Therefore, the electronic device 100 may determine that S0 is the initial image frame.

Figure 13:
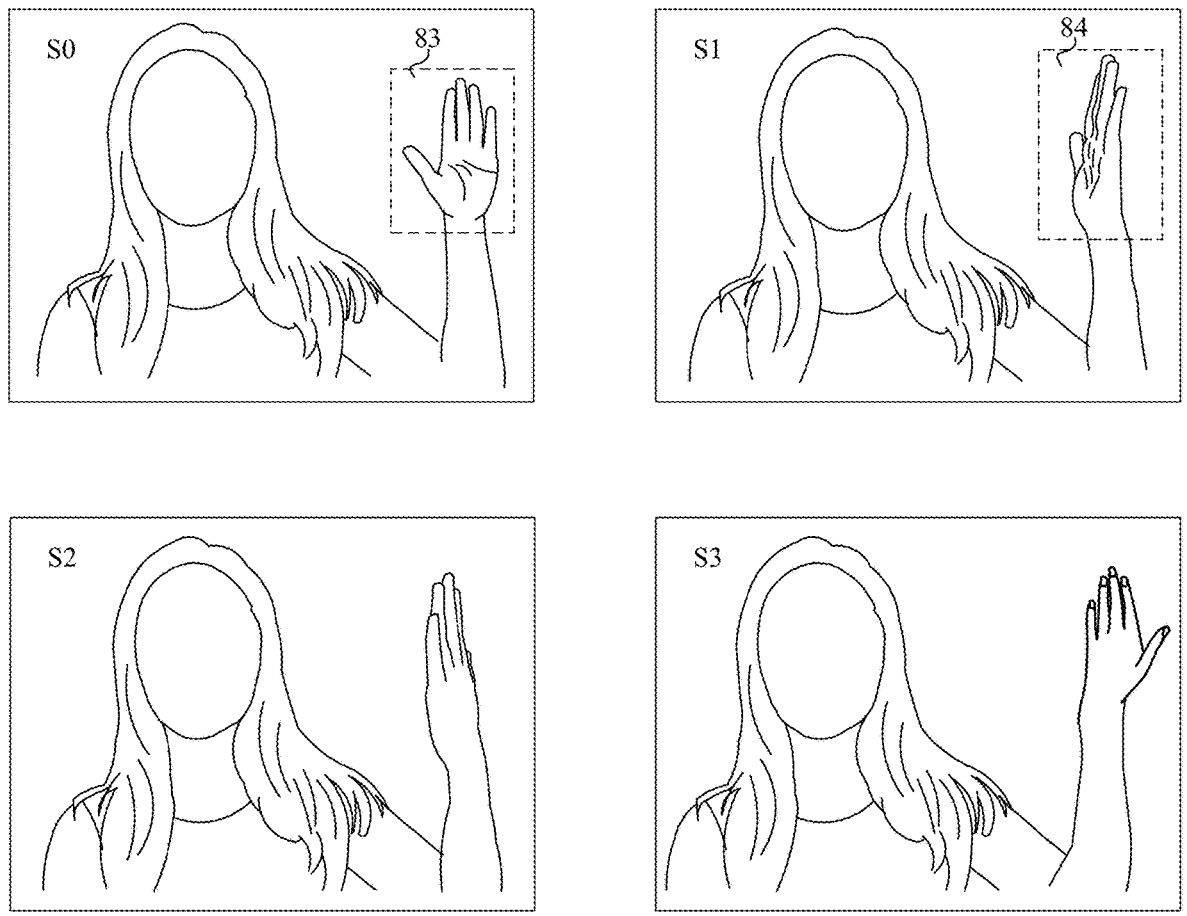
FIG. 13 is a schematic diagram of an image frame that includes a hand image and that is obtained by an electronic device according to an embodiment of this application.

A size of an image region of the hand image 83 is determined based on the gesture recognition model. Optionally, sizes of hand images, in any images, that are output by the gesture recognition model after recognizing the images are the same (for example, sizes of an area of a palm frame of the hand image 83 and an area of a palm frame of a hand image 84 in FIG. 13 are the same, where the palm frame is similar to a face frame and belongs to a palm frame correspondingly displayed after the hand is recognized, and the hand image is within the palm frame). Optionally, sizes of hand images, in any images, that are output by the gesture recognition model after recognizing the images are different (for example, in FIG. 13, S0 is the front of the palm, and S1 is a side of the hand, and therefore an area of a palm frame of the hand image 83 is larger than an area of a palm frame of a hand image 84 in FIG. 13). The size of the hand image is determined based on recognition of pixel features by the gesture recognition model. For example, the size may be a rectangular box formed by a leftmost point, a rightmost point, an uppermost point, and a lowermost point of the recognized hand image (or a rectangular box formed through expansion by W columns or W rows of pixels, for example, W is 5 or 10); or may inherit an area of a palm frame of a hand image determined at a moment S0 in FIG. 13; or may correspond to a displayed palm frame according to a specific requirement, for example, an area of a palm frame of the front of the palm is larger than an area of a palm frame of a side of the palm. This is not limited in this application.

However, in some scenarios, a region occupied by a portrait in an entire image frame is small. Therefore, a proportion of a gesture in the portrait to the entire image frame is smaller. Therefore, a recognition effect of simply using the gesture recognition model to determine whether an image frame includes a gesture is poor. Further, this is not conducive to subsequent recognition of bone points of a hand in an image by using a bone point recognition algorithm.

Therefore, this embodiment of this application provides another method for recognizing and locating a gesture in an image. In the method, the electronic device 100 may first recognize a face image in an image frame by using a face detection algorithm, and then the electronic device 100 may determine a body image in the image based on a region in which the face image is located in the image frame. Then the electronic device 100 may recognize the body image and determine a gesture in the body image.

Figure 9B:
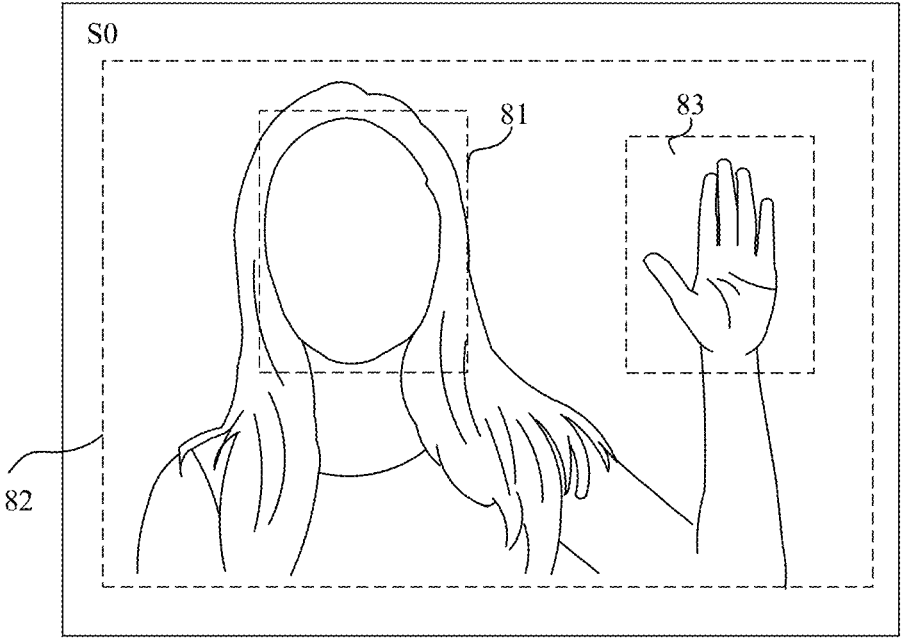

With reference to FIG. 9B, the electronic device 100 may first recognize a face image 81 in the image frame S0 by using the face detection algorithm. Then the electronic device 100 may extend outward based on the face image 81 to obtain a body image 82. Optionally, the electronic device 100 may extend by D1 pixels upward, D2 pixels downward, D3 pixels to the left, and D4 pixels to the right based on the face image 81 to determine the body image 82. D1, D2, D3, and D4 may be preset based on empirical values. Specific values of D1, D2, D3, and D4 are not limited in this embodiment of this application.

After determining the body image 82, the electronic device 100 may recognize a gesture in the body image 82 by using a gesture recognition algorithm. Therefore, the electronic device 100 may recognize the hand image 83 from the body image 82. The hand image 83 conforms to a gesture feature of start of the hand flip gesture. Therefore, the electronic device 100 may determine that S0 is the initial image frame.

The gesture recognition method shown in FIG. 9B helps the electronic device 100 more accurately recognize and locate a gesture in an image frame. Further, when recognizing bone points of a gesture in an image by using the bone point recognition algorithm, the electronic device 100 can more accurately recognize bone points of a gesture in an image frame.

After recognizing an image frame including a raised palm by using the method shown in FIG. 9A or FIG. 9B, the electronic device 100 may determine that the image frame is the initial image frame. With reference to a user interface, in the scenario shown in FIG. 3A, after recognizing that an image frame in the image frame stream collected by the camera conforms to the feature shown in FIG. 8A or FIG. 8B, the electronic device 100 may determine that the image frame is the initial image frame. Then the electronic device 100 may display the user interface shown in FIG. 3E. The electronic device 100 may prompt, by using the control 21 in FIG. 3E, the user to complete a gesture before timing of the control 21 ends (that is, the loading of the loading cycle is completed). Therefore, the electronic device 100 may determine to use, as an image frame for recognizing a gesture of the user by the electronic device 100, a recognized image frame (the image frame shown in FIG. 8A or FIG. 8B) of the user raising the palm to an image frame collected when the loading of the loading cycle is completed.

Optionally, the electronic device 100 may alternatively use, as a new initial image frame, the first frame of image collected after the control 21 is displayed, or the first frame of image collected after the control 21 is displayed and timing starts. Subsequently, gesture recognition calculation is performed using the new initial image frame.

In some embodiments, the control 21 may alternatively prompt the user to complete a gesture after the loading of the loading cycle is completed. In this case, the electronic device 100 may obtain a video frame within a period of time after the loading of the loading cycle is completed, and use the video frame as an image frame for recognizing a gesture of the user by the electronic device 100.

After locating the gesture in the image frame by using the method shown in FIG. 9A or FIG. 9B, that is, after determining the initial image frame, the electronic device 100 further needs to determine a gesture vector offset [0] for representing a state of a hand (a palm or the back of the hand) in the initial image frame. The offset [0] may be used for the electronic device 100 to subsequently determine whether the user has made a hand flip gesture.

Specifically, the electronic device 100 may recognize bone points of the hand of the user in the initial image frame by using a bone point detection algorithm. The bone point detection algorithm is existing, for example, Kinect-based bone point detection. Details are not described herein.

Figure 10:
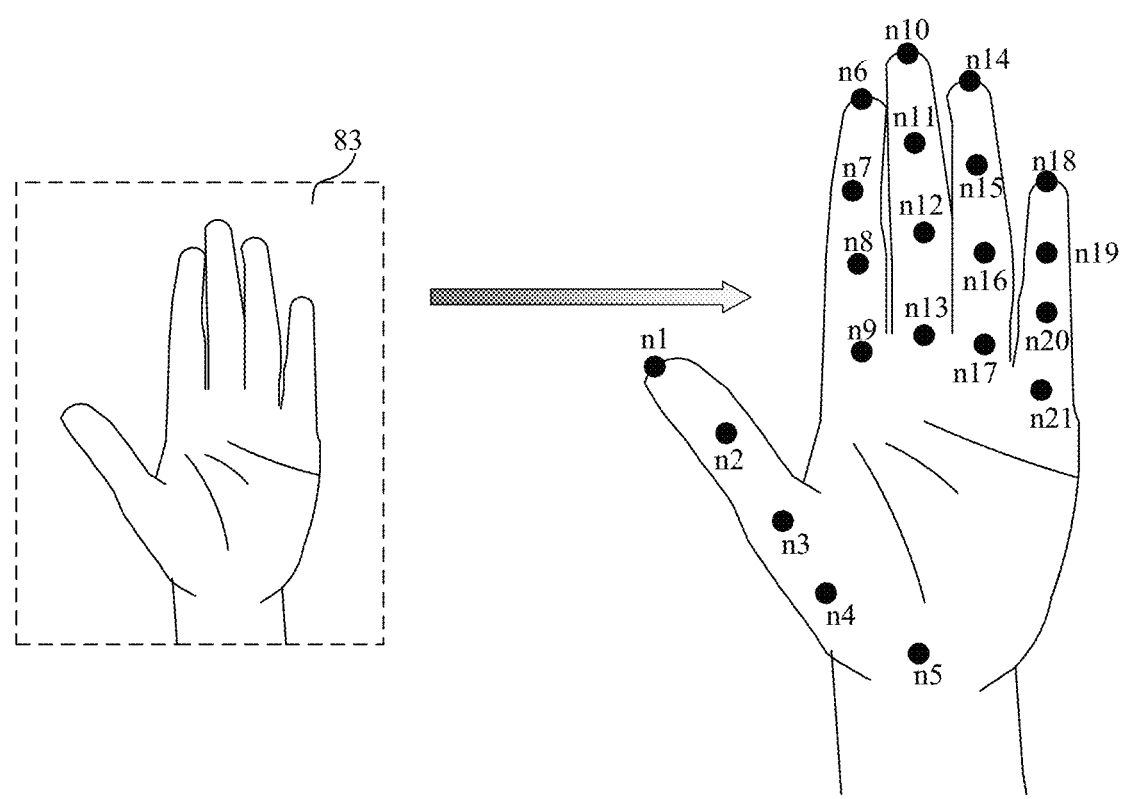
FIG. 10 is a schematic diagram of recognizing bone points of a hand image frame according to an embodiment of this application.

The initial image frame S0 determined in the foregoing process is used as an example. FIG. 10 is an example schematic diagram of recognizing, by the electronic device 100, bone points of a gesture in S0 by using the bone point detection algorithm. As shown in FIG. 10, when S0 is input into a bone point detection model, the electronic device 100 may determine 21 bone points in S0 that describe the hand: n1 to n21. In this embodiment of this application, the bone point detection model is a model that is built based on the bone point detection algorithm and that is used to recognize bone points of a hand in an image.

A quantity of bone points of a hand in an image frame that are obtained by recognizing the image frame by using the bone point detection model is preset. In this embodiment of this application, a quantity of bone points of the hand in S0 that are obtained by recognizing S0 by using the bone point detection model is 21. It can be understood that, with different bone point detection algorithms or different parameter settings in the bone point detection algorithm, a quantity of bone points of a hand image in S0 that are recognized by the electronic device 100 also varies. Further, positions of the recognized bone points are also different.

After recognizing the bone points of the gesture, the electronic device 100 may determine two gesture feature points from the bone points. The two gesture feature points may be used to construct a gesture vector offset representing a state of a hand in the image frame.

With reference to FIG. 10, for example, the electronic device 100 may determine a bone point (n1) at the top of a thumb and a bone point (n18) at the top of a litter finger as gesture feature points. In another embodiment, the gesture feature points may alternatively be a combination of any one of n1 to n4 or n6 to n9 and any one of n14 to n21, for example, n6 and n14, or n2 and n20. In some embodiments, the electronic device 100 may further determine a center point C1 by using one or more bone points of n1 to n4 or n6 to n9, determine another center point C2 by using one or more bone points of n14 to n21, and then construct, by using C1 and C2, a gesture vector representing a state of a palm. This is not limited in this embodiment of this application.

The electronic device 100 may build an X coordinate axis (X axis) by using a starting point of a pixel on the left in the image frame as an origin and using a horizontal rightward direction as a positive direction. After determining the two gesture feature points, the electronic device 100 may determine positions of the two gesture feature points on the X axis, that is, coordinates on the X axis. Then the electronic device 100 may determine, by using the coordinates of the two gesture feature points on the X axis, a vector representing the state of the hand in the image frame, where the vector is denoted as a gesture vector. A direction of the gesture vector may represent a position of a gesture feature point in the image frame, and may be used to represent the state of the hand (for example, the palm faces a display, the back of the hand faces the display, or a side of the hand faces the display), and may further represent a position relationship between the palm or the back of the hand and the camera of the electronic device 100, that is, the state of the hand, including that the palm faces the camera of the electronic device 100 or the back of the hand faces the camera of the electronic device 100. A modulus of the gesture vector may reflect an angle between the palm or the back of the hand and the camera of the electronic device 100.

Optionally, the X axis may alternatively be a coordinate axis built by using a starting point of a pixel on the right as an origin and using a horizontal leftward direction as a positive direction. This is not limited in this embodiment of this application.

Figure 11:
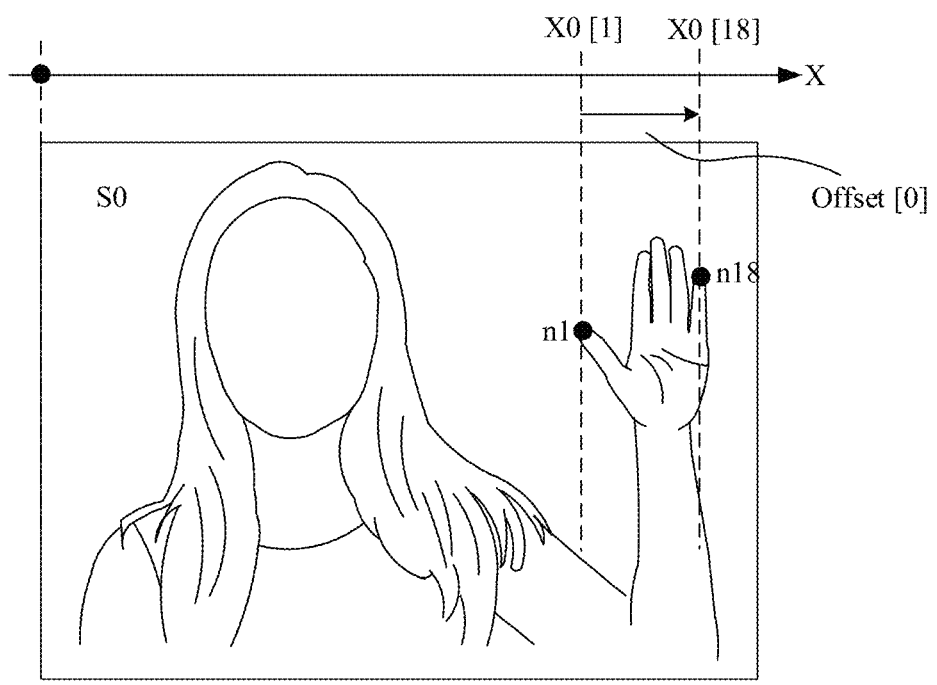
FIG. 11 is a schematic diagram of determining a gesture vector in an initial image frame according to an embodiment of this application.

Likewise, the initial image frame S0 determined above is used as an example. FIG. 11 is an example schematic diagram of determining, by the electronic device 100, a gesture vector for representing a state of a hand in S0. As shown in FIG. 11, the electronic device 100 may build an X coordinate axis by using a starting point of a pixel on the left in S0 as an origin and using a horizontal rightward direction as a positive direction. Based on the bone point detection algorithm, the electronic device 100 may obtain the bone points (n1 to n21) of the gesture in S0. When recognizing the bone points, the electronic device 100 may determine coordinates of the bone points on the X axis.

FIG. 11 shows only two gesture feature points (n1 and n18) among the bone points. When recognizing n1 and n18, the electronic device 100 may determine coordinates of n1 and n18 on the X axis, where the coordinates of n1 and n18 are denoted as X0 [1] and X0 [18] respectively. Further, the electronic device 100 may determine, by using the positions X0 [1] and X0 [18] of n1 and n18, a gesture vector Offset [0] for representing a state of a hand in S0, where Offset[0]=X0[18]−X0[1].

Optionally, the gesture vector Offset [0] may alternatively be expressed as follows:

Offset[0]=X0[1]−X0[18].

This is not limited in this embodiment of this application.

In the dual-scene photographing scenario described in this embodiment of this application, the electronic device 100 includes two or more cameras for collecting images. In this case, the electronic device 100 may obtain two or more image frame streams. In the foregoing case, the electronic device 100 may separately recognize initial image frames in the two or more image frame streams and detect a hand flip gesture in each image frame stream with reference to the foregoing method. Details are not described herein again.

S102: Obtain Q image frames after the initial image frame, recognize the Q image frames and the initial image frame, and determine whether the user has made a hand flip gesture.

The initial image frame may be used to represent start of a gesture. Due to continuity of an action, a plurality of frames of images after the initial image frame also include gestures, and form a gesture action with the initial image frame. Therefore, after recognizing the initial image frame, the electronic device 100 may recognize, by using the initial image frame and the plurality of image frames after the initial image frame, a gesture made by the user.

After determining the initial image frame and the gesture vector Offset [0] for representing the state of the hand in the initial image frame, the electronic device 100 may obtain an image frame after the initial image frame, where the image frame is denoted as a subsequent image frame. Then the electronic device 100 may determine, by using directions of gesture vectors that represent states of hands and that are in the subsequent image frame and the initial image frame, whether a hand in the subsequent image frame has flipped compared with a hand in the original image frame. When recognizing that the directions of the gesture vectors that are in the two image frames and that represent the states of the hands are opposite, the electronic device 100 may determine that the user has made a hand flip gesture.

Usually, the electronic device 100 may collect 30 frames of images within 1 second, and the user may complete a gesture within 1 second. Duration in which the user completes a gesture does not exceed 3 minutes. Therefore, the electronic device 100 may determine that an image frame sequence for recognizing a gesture is 90 frames of images after the initial image frame. The electronic device 100 may recognize a gesture of the user by using the 90 frames of images and the initial image frame. 90 may be referred to as a quantity Q of frames of image frames after the initial image frame that are used for recognizing a hand flip gesture. The quantity Q of frames is not limited to 90. Specifically, a value of the quantity Q of frames varies with changes of a video frame rate and preset maximum duration for completing a gesture. The quantity Q of frames is not limited in this embodiment of this application. In subsequent embodiments, that Q=90 is used as an example.

Figure 12:
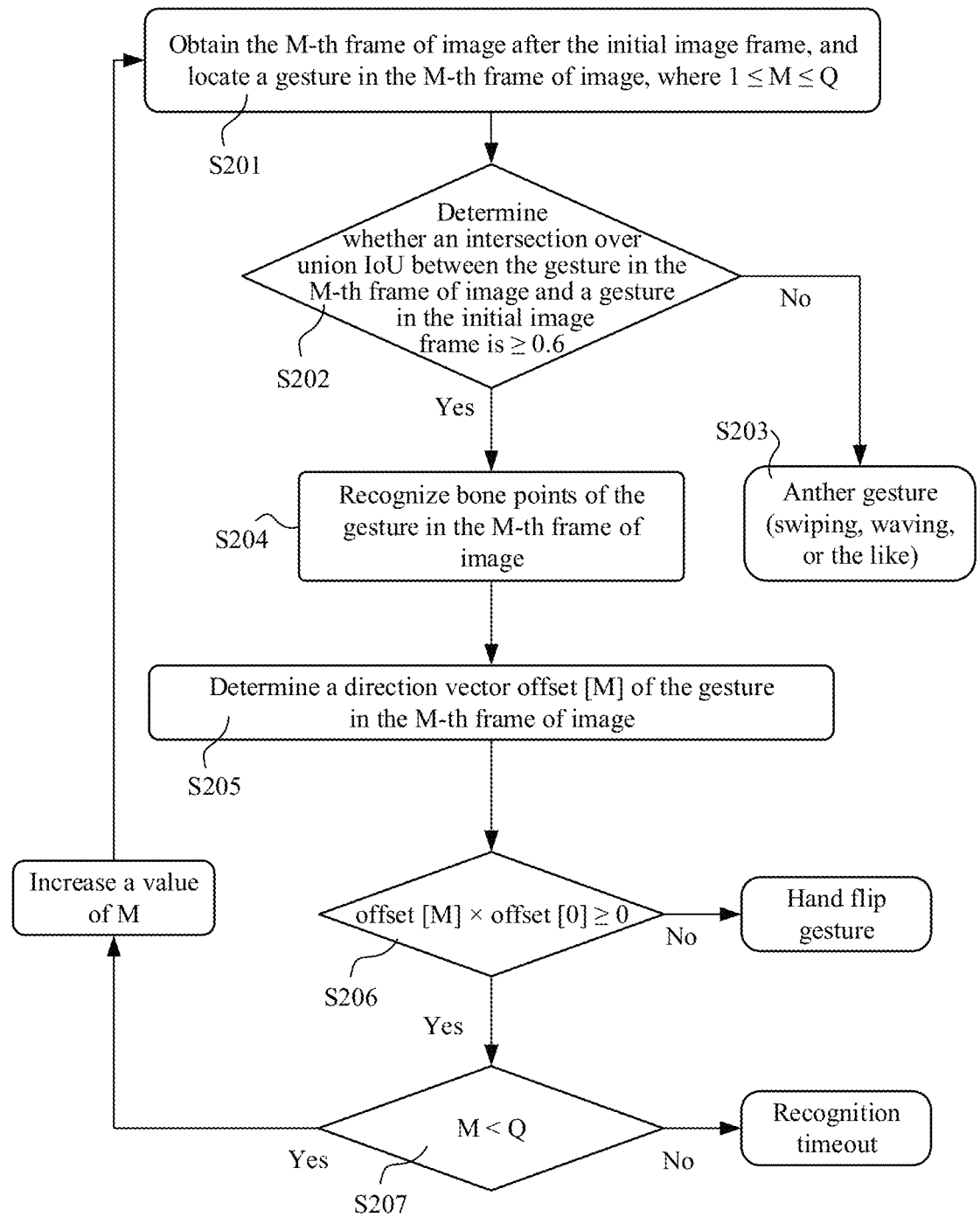
FIG. 12 is a flowchart of recognizing a hand flip gesture by an electronic device according to an embodiment of this application.

Specifically, FIG. 12 is an example flowchart of recognizing, by the electronic device 100, the initial image frame and the Q image frames after the initial image and determining that the user has made a hand flip gesture. With reference to the flowchart shown in FIG. 12, the following specifically describes a process of determining, by the electronic device 100, that the user has made a hand flip gesture.

With reference to the descriptions of the foregoing embodiments, after determining the initial image frame, the electronic device 100 displays the user interface including the control 21 in FIG. 3E. The control 21 may prompt the user to complete a specific gesture. The electronic device 100 may obtain an image frame stream collected when the control 21 is displayed and recognize a gesture made by the user. In this case, the electronic device 100 may obtain any frame from the image frame stream collected when the control 21 is displayed, and determine, in combination with the initial image frame, whether the user has made a hand flip gesture. In this case, a quantity of image frames included in the image frame stream collected when the control 21 is displayed is Q.

S201: Obtain the M-th frame of image after the initial image frame, and locate a hand image in the M-th frame of image, where 1≤M≤Q.

In this case, the M-th frame of image is any frame obtained from the image frame stream collected when the control 21 is displayed.

FIG. 13 shows an example of the initial image frame S0 obtained by the electronic device 100 and a plurality of frames of images after the initial image frame S0. As shown in FIG. 13, S0 is the initial image frame, and S1, S2, and S3 are three frames of images after S0 obtained by the electronic device 100, that is, S1, S2, and S3 are any three frames of images in the image frame stream collected when the control 21 is displayed. The any three frames of images may be adjacent. For example, S1, S2, S3 may be respectively the first frame image, the second frame image, and the third frame image, after the initial image frame S0, in the image frame stream collected when the control 21 is displayed.

First, the electronic device 100 may obtain the first frame image after the initial image frame S0, that is, S1. After obtaining S1, the electronic device 100 may locate a hand image in S1. As shown in FIG. 13, the electronic device 100 may locate a hand image 84 in S1. For a method for locating the hand image in S1 by the electronic device 100, refer to the method shown in FIG. 9A or FIG. 9B in S101. Details are not described herein again.

Optionally, there may be an interval between S1, S2, and S3. For example, S1, S2, S3 may alternatively be the R1-th frame of image, the R2-th frame of image, and the R3-th frame of image in the image frame stream collected when the control 21 is displayed, where R1<R2<R3. Quantities of image frames between R1, R2, and R3 may be equal or unequal. That is, the electronic device 100 may extract S frames of images from the Q frames of images after the initial image frame at fixed intervals or non-fixed intervals. Then the electronic device 100 may determine, by using the S frames of images and the initial image frame, whether the user has made a hand flip gesture. For example, the electronic device 100 may obtain one frame of image at an interval of four frames after recognizing the initial image frame S0. In this case, S1, S2, and S3 may be the 5th frame, the 10th frame, and the 15th frame after S0.

With reference to the descriptions of the foregoing embodiments, in some embodiments, the electronic device 100 may use, as a new initial image frame, the first frame of image collected after the control 21 is displayed, or the first frame of image collected after the control 21 is displayed and timing starts.

In this case, the M-th frame of image in S201 is Q frames of images collected after the control 21 is displayed, or the 2nd frame to the Q-th frame of Q frames of images obtained after the control 21 is displayed and timing starts.

In addition, in some embodiments, the electronic device 100 may use, as an image frame for recognizing a gesture of the user, an image frame stream within a period of time after display of the control 21 ends. In this case, the M-th frame of image is any frame in the image frame stream within the period of time after display of the control 21 ends.

S202: Determine an intersection over union (Intersection over Union, IoU) of a gesture in the M-th frame of image and the gesture in the initial image frame, and determine whether IoU≥0.6 holds.

When the user completes a hand flip gesture, a position change of the hand of the user is slight. For example, when a position of the hand is level with a head and 15 cm away from the head when the user stretches the palm and starts to perform the hand flip gesture, after the user completes the hand flip gesture, a position of the hand is also basically level with the head and 15 cm away from the head, that is, no significant position change occurs. The position is a relative position between a gesture image and a face image.

According to the foregoing rule, in a case that a position of the hand of the user in the M-th frame of image significantly changes compared with a position of the hand of the user in the initial image frame, in this case, a gesture completed by the user is more likely to be a gesture with a significant position change, for example, swiping or waving. Therefore, the electronic device 100 may determine that image content included in the M-th frame of image and the initial image frame is not a hand flip gesture.

Therefore, before using gesture vectors that are in image frames and that represent states of the hand to recognize whether the user has made a hand flip gesture, the electronic device 100 may determine, by using an intersection over union (IoU) between positions, in the image frames, of gesture images in the two frames of images, whether the positions of the gestures in the two frames of images conform to a feature of a hand flip gesture: a slight position change. The intersection over union (IoU) may be used to represent a proportion of an overlapping region between two image regions. A larger IoU indicates a larger area of an overlapping region between two image regions. On the contrary, a smaller IoU indicates a smaller area of an overlapping region between two image regions.

A calculation formula for the IoU between the positions, in the image frames, of the gesture images in the two frames of images is as follows:

$$IoU = \text{gesture intersection} / \text{gesture union}.$$

The gesture intersection is an intersection between regions, in the image frames, in which the hands in the two frames of images are located. The gesture union is a union between the regions, in the image frames, in which the hands in the two frames of images are located.

For example, after the electronic device 100 determines the hand image 84 in the first frame of image (S1), the electronic device 100 may determine an IoU between a size and a position of a region occupied by the hand image 84 in S1, and a size and a position of a region occupied by the hand image 83 in S0.

Figure 14:
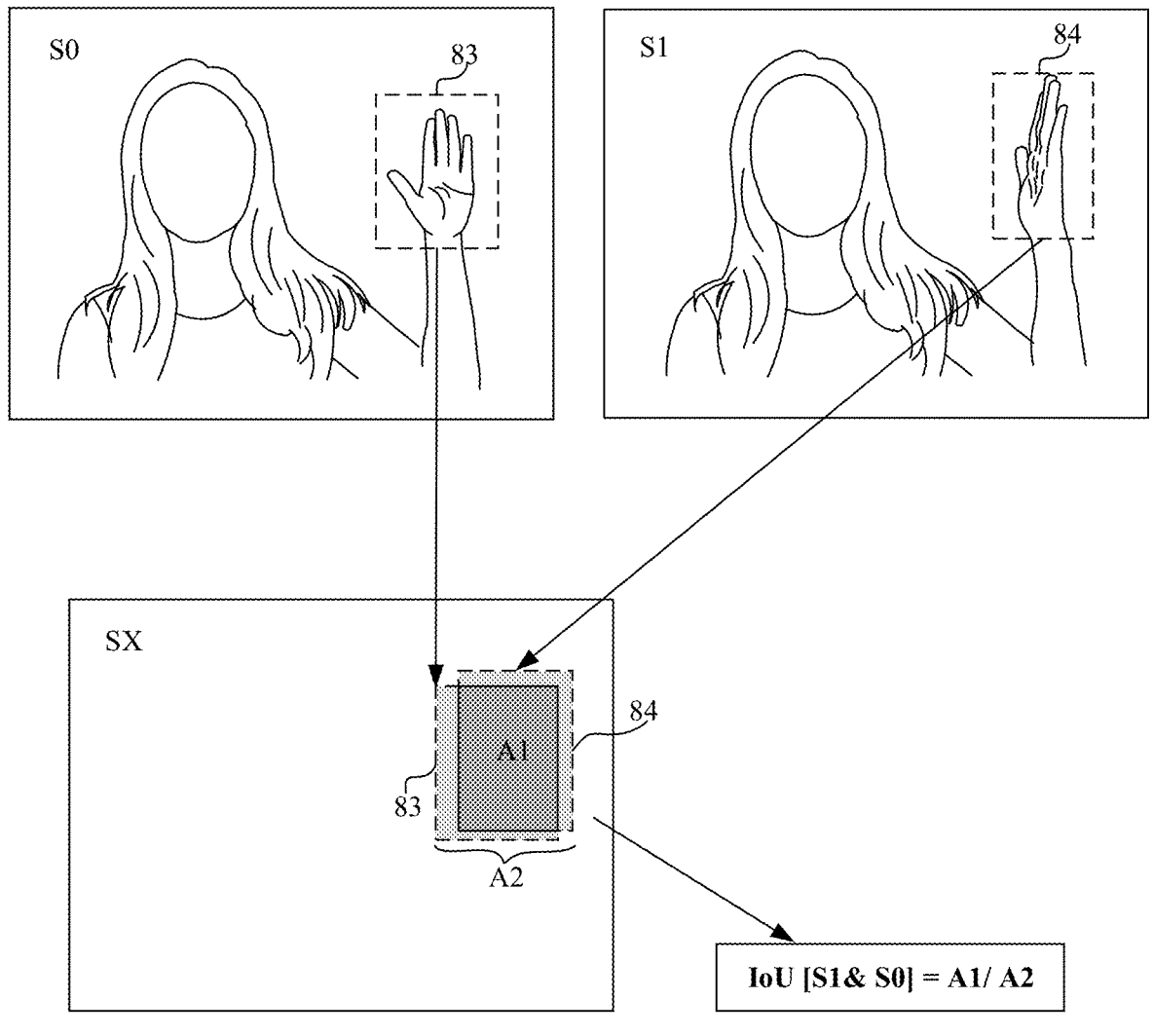
FIG. 14 is a schematic diagram of determining, by an electronic device, an intersection over union between a hand image in an initial image frame and a hand image in an image frame collected after the initial image frame according to an embodiment of this application.

FIG. 14 is an example schematic diagram of determining, by the electronic device 100, an IoU between gestures in S1 and S0. As shown in FIG. 14, an image region covered by a dashed-line box corresponding to the hand image 83 may be referred to as a region in which the hand image 83 is located in S0, and an image region covered by a dashed-line box corresponding to the hand image 84 may be referred to as a region in which the hand image 84 is located in S1.

In this case, an intersection between gestures in S1 and S0 is an intersection between a region 83 and a region 84 in an image frame SX, that is, a region represented by a dark gray rectangle, and is denoted as A1; and a union between the gestures in S1 and S0 is a union between the 83 and the region 84 in the image frame SX, that is, a sum of a light gray region and the dark gray rectangle, and is denoted as A2. The image frame SX is virtual.

Further, an IoU [S1&S0] between positions, in the image frames, of the gesture images in S1 and S0 is as follows:

$$IoU[S1\&S0] = A1/A2.$$

The IoU between the two image frames being closer to 1 indicates that the positions, in the two image frames, of the gesture images in the two image frames are closer. Particularly, when IoU=1, the positions, in the two image frames, of the gesture images in the two image frames are the same. On the contrary, the IoU between the two image frames being closer to 0 indicates that an overlapping range between the positions, in the two image frames, of the gesture images in the two image frames is smaller, that is, hand positions in the two image frames have a significant change.

Therefore, after determining the IoU between the positions, in the image frames, of the gesture images in the two image frames, the electronic device 100 may determine whether the IoU meets a preset IoU threshold. In this embodiment of this application, the IoU threshold is 0.6. In another embodiment, the IoU threshold may alternatively be 0.7, 0.8, or the like. This is not limited in this embodiment of this application.

For example, the IoU threshold is 0.6. When the IoU [S1&S0]<0.6, that is, IoU [S1&S0]≥0.6 does not hold, the electronic device 100 may determine that gesture positions in S1 and S0 have a significant change. This does not conform to the feature of a hand flip gesture. Therefore, the following step is performed: S203: The electronic device 100 determines that the user has made another gesture. For example, the anther gesture is a swiping or waving gesture.

It can be understood that, before determining that the user has made the another gesture, the electronic device 100 further performs calculation for matching the another gesture. Details about a process of recognizing the another gesture is not limited in this embodiment of this application. Certainly, in a process of performing matching for another gesture, the electronic device 100 may alternatively fail to match any other gesture. In this case, the electronic device 100 may continue to obtain image frames after S1, for example, S2 and S3. Then the electronic device 100 may locate a gesture in a new image frame to calculate an IoU between a gesture in the new image frame and the gesture in the initial image frame.

On the contrary, when IoU [S1&S0]≥0.6 holds, the electronic device 100 may determine that positions of the gesture in the M-th frame of image and the gesture in the initial image frame are close. In this case, the electronic device 100 may determine whether the positions of the gestures in S1 and S0 conform to the feature of a hand flip gesture: a slight position change. Further, the electronic device 100 may recognize bone points of the gesture in S1, and determine a gesture vector representing a state of a hand in S1.

Before a gesture vector representing a state of a hand in the M-th frame of image is determined, the intersection over union between the gestures in the M-th frame of image and the initial image frame is calculated, so that an image frame that obviously does not conform to the feature of a hand flip gesture can be quickly filtered out, thereby avoiding redundant calculation and improving calculation efficiency.

S204: Recognize bone points of the gesture in the M-th frame of image.

After determining that the IoU between the gestures in the M-th frame of image and the initial image frame meets a requirement of the IoU threshold, the electronic device 100 may recognize the bone points of the gesture in the M-th frame of image by using the bone point detection algorithm. For a specific process of recognizing the bone points of the gesture in the M-th frame of image by using the bone point detection algorithm, refer to the descriptions of FIG. 10 in S101. Details are not described herein again.

Likewise, the electronic device 100 may determine two gesture feature points from the recognized bone points of the gesture in the M-th frame of image. Herein, the two gesture feature points determined by the electronic device 100 from the bone points in the M-th frame of image should correspond to the two gesture feature points in the original image frame. For example, in a case that the two gesture feature points in the original image frame are the bone point (n1) at the top of the thumb and the bone point (n18) at the top of the little finger, the electronic device 100 should also determine, as gesture feature points, a bone point (n1) at the top of a thumb and a bone point (n18) at the top of a little finger in the M-th frame of image, and then construct, by using n1 and n18, a gesture vector offset [M] for representing the state of the hand in the M-th frame of image.

S205: Determine the gesture vector offset [M] for representing the state of the hand in the M-th frame of image.

After determining the gesture feature points of the M-th frame of image, the electronic device 100 may determine positions of the gesture feature points on the X axis. With reference to the method of determining the gesture vector offset [0] for representing the state of the hand in the initial image frame in FIG. 11, the electronic device 100 may determine the gesture vector offset [M] of the gesture in the M-th frame of image by using the positions of the gesture feature points of the M-th frame of image.

Figure 15:
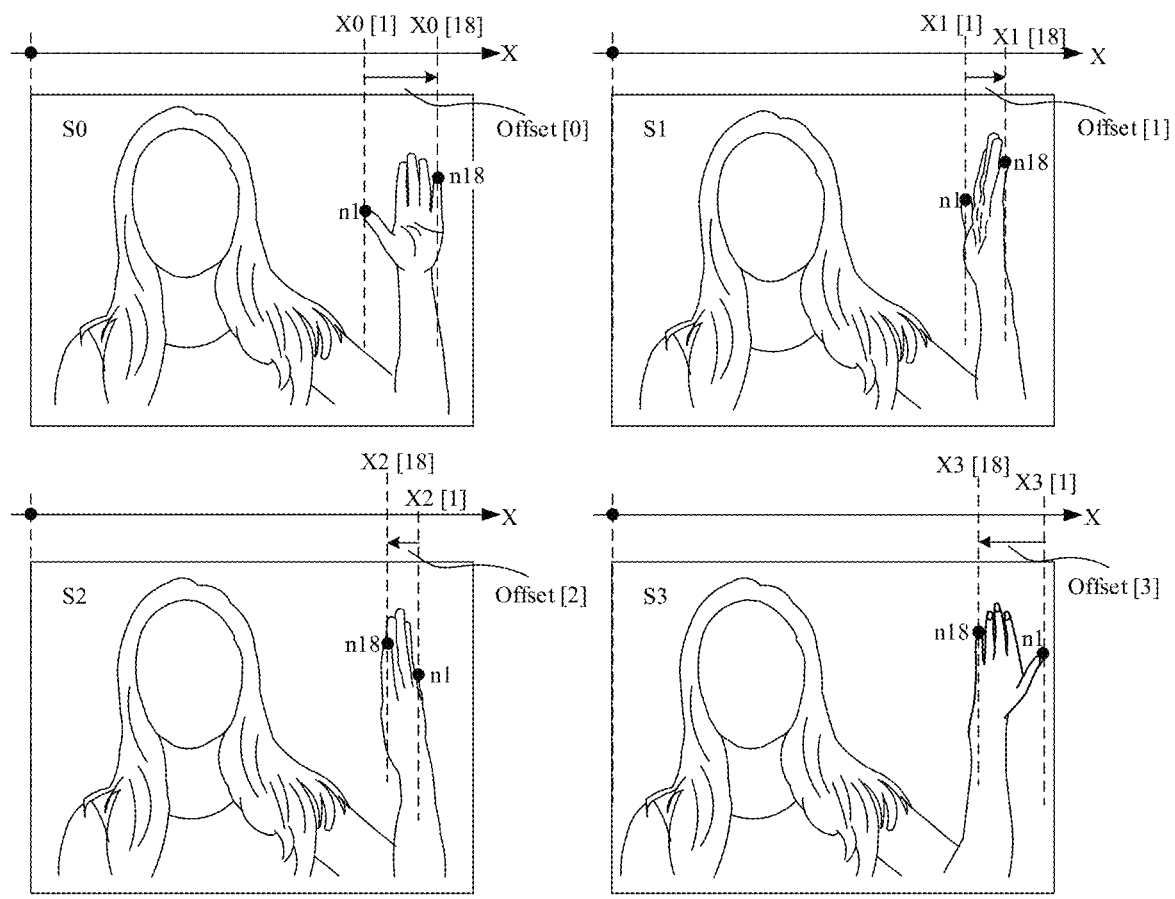
FIG. 15 is a schematic diagram of recognizing a hand flip gesture by an electronic device according to an embodiment of this application.

The first frame of image S1 after the initial image frame S0 is used as an example. As shown in FIG. 15, bone point detection is performed on S1. The electronic device may recognize bone points n1 to n21 of the gesture in S1. In addition, the electronic device 100 may determine positions of the bone points on the X axis. FIG. 15 shows only the gesture feature points n1 and n18 determined based on the gesture bone points, and positions X1 [1] and X1 [18] of the gesture feature points n1 and n18 on the X axis.

In this case, the electronic device 100 may determine the gesture vector Offset [1] of the gesture in S1 based on X1 [1] and X1 [18]:

Offset[1]=$X1[18]-X1[1]$.

As shown in FIG. 15, in this case, Offset [1]>0, and a direction of the Offset [1] is the positive direction of the X axis.

S206: Determine whether offset [M]×offset [0]≥0 holds.

After determining the gesture vector offset [M] representing the state of the hand in the M-th frame of image, the electronic device 100 may determine, by using the offset [M] and the gesture vector offset [0] of the initial image frame, whether the user has made a hand flip gesture.

Specifically, the electronic device 100 may calculate a product of the gesture vector offset [M] of the M-th frame of image and the gesture vector offset [0] of the initial image frame: offset [M]×offset [0].

Offset [M]×offset [0]≥0 may indicate that offset [M]≥0 and offset [0]≥0, or offset [M]≤0 and offset [0]≤0. When offset [M]≥0 and offset [0]≥0, a direction indicated by the gesture vector of the M-th frame of image is the positive direction of the X axis, and a direction indicated by the gesture vector of the initial image frame is also the positive direction of the X axis. When offset [M]≤0 and offset [0]≤0, a direction indicated by the gesture vector of the M-th frame of image is a negative direction of the X axis, and a direction indicated by the gesture vector of the initial image frame is also the negative direction of the X axis.

Regardless of whether offset [M]≥0 and offset [0]≥0, or offset [M]≤0 and offset [0]≤0, the state of the hand in the M-th frame of image is the same as that in the initial image frame, and both are a state in which the palm faces the camera, or both are a state in which the back of the hand faces the camera. This does not conform to the feature of a hand flip gesture (the state of the hand changes). In this case, a gesture that is recognized by the electronic device 100 and that is formed by the initial image frame and the M-th frame of image is not a hand flip gesture.

Offset [M]×offset [0]<0 may indicate that offset [M]<0 and offset [0]>0, or offset [M]>0 and offset [0]<0. When offset [M]<0 and offset [0]>0, a direction indicated by the gesture vector of the M-th frame of image is the negative direction of the X axis, and a direction indicated by the gesture vector of the initial image frame is the positive direction of the X axis. When offset [M]>0 and offset [0] <0, a direction indicated by the gesture vector of the M-th frame of image is the positive direction of the X axis, and a direction indicated by the gesture vector of the initial image frame is the negative direction of the X axis.

Regardless of whether offset [M]<0 and offset [0]>0, or offset [M]>0 and offset [0]<0, the state of the hand in the M-th frame of image is different from that in the initial image frame. Specifically, the state of the hand in the M-th frame of image is opposite to that in the initial image frame. This conforms to the feature of a hand flip gesture. In this case, the electronic device 100 may determine that a hand flip gesture is recognized.

Therefore, when determining whether offset [M]×offset [0]≥0 holds, if offset [M]×offset [0]≥0 holds, the electronic device 100 may determine that no hand flip gesture is recognized; or on the contrary, if offset [M]×offset [0]≥0 does not hold, the electronic device 100 may determine that a hand flip gesture is recognized.

The gesture vector Offset [1] of S1 in FIG. 15 is used as an example. After determining the Offset [1], the electronic device 100 may calculate a product of the Offset [1] and the gesture vector offset [0] of the initial image frame S0: offset [1]×offset [0]. In this case, offset [0]>0 and offset [1]≥0. Therefore, offset [1]×offset [0]≥0 holds. Therefore, the electronic device 100 may determine that no hand flip gesture is recognized.

It can also be learned from the images shown in S0 and S1 in FIG. 15 that a palm in S0 faces the camera of the electronic device 100, and a palm in S1 still faces the camera of the electronic device 100. The gestures indicated by S0 and S1 do not reflect a flip action, that is, they are not hand flip gestures.

S207: Determine whether M<Q holds.

When the electronic device 100 cannot recognize, by using the initial image frame and the M-th frame of image, that the user has made a hand flip gesture, the electronic device 100 may continue to obtain an image frame after the M-th frame of image, for example, the (M+1)-th frame of image or the (M+2)-th frame of image, and determine whether a product of a gesture vector (an offset [M+1], an offset [M+2], or the like) of the image frame after the M-th frame of image and the gesture vector offset [0] of the initial image frame is greater than or equal to 0.

With reference to FIG. 15, after determining that offset [1]×offset [0]≥0 holds, that is, after failing to recognize a hand flip gesture, the electronic device 100 may obtain an image frame after S1, for example, S2 or S3. Then the electronic device 100 may repeat the processing method of S201 to S206 to determine a gesture vector (an offset [2] or an offset [3]) of the image frame, for example, S2 or S3, and continue to recognize whether the user has made a hand flip gesture.

With reference to the preset maximum time for completing a gesture, that is, the quantity Q of frames of image frames after the initial image frame that can be used for recognizing a hand flip gesture, before obtaining the image frame after the M-th frame of image, the electronic device 100 needs to determine whether the current M-th frame of image is the last frame of image of the image frames that can be used for recognizing a hand flip gesture, that is, whether M<Q.

If M=Q, that is, the M-th frame of image is the last frame of image, and the electronic device 100 has not recognized a hand flip gesture, the electronic device 100 no longer continues to obtain an image frame after the M-th frame of image, that is, determines that recognition has timed out and recognition is to be stopped. If M<Q, that is, the M-th frame of image is not the last frame of image, and the electronic device 100 has not recognized a hand flip gesture, in this case, the electronic device 100 may further obtain an image frame after the M-th frame of image, and continue to recognize whether the user has made a hand flip gesture.

For example, Q=90. After determining that offset [M]× offset [0]≥0 holds, the electronic device 100 needs to determine whether M is less than 90. If M≥90, that is, M<90 does not hold, the electronic device 100 recognizes no hand flip gesture in 90 frames of images within a preset time range. In this case, the electronic device 100 determines that a timeout occurs, and no longer continues to perform recognition. On the contrary, if M<90 holds, the electronic device 100 recognizes no hand flip gesture currently, but the electronic device 100 may further obtain an image frame after the M-th frame, and continue to recognize whether the user has made a hand flip gesture.

With reference to FIG. 15, when no hand flip gesture can be recognized using S1 and S0, the electronic device 100 may obtain the second frame of image after S0, that is, S2. In this case, S2=2<90, that is, S2 is not the last frame of image. Therefore, the electronic device 100 may determine the gesture vector Offset [2] of S2 according to the processing method shown in S201 to S205. As shown in FIG. 15, in this case, Offset [2]<0. Therefore, offset [2]×offset [0]≥0 does not hold. In this case, the electronic device 100 may determine that a hand flip gesture is recognized.

If S1 is the 90th frame image after the initial image frame, and offset [1]×offset [0]≥0, in this case, the electronic device 100 may determine that a timeout occurs. The electronic device 100 may stop recognition. Then the electronic device 100 may obtain a new series of image frames after the foregoing image frames, and recognize whether the new series of image frames include an initial image frame that conforms to the feature of a hand flip gesture. After determining a new initial image frame, the electronic device 100 may re-determine an image frame sequence for recognizing a hand flip gesture, and then re-recognize whether the user has made a hand flip gesture.

In some embodiments, the electronic device 100 may also set a minimum threshold L of the gesture vector Offset of the M-th frame of image. After determining that a direction indicated by the gesture vector change, that is, offset [M]× offset [0]≥0 does not hold, the electronic device 100 may further detect whether the offset [M] meets the minimum threshold. When the offset [M] also meets a requirement of the minimum threshold, the electronic device 100 determines that a hand flip gesture is recognized.

For example, it is assumed that the minimum threshold of the gesture vector Offset is 20, and this is denoted as L=20 and Offset [2]=18. After determining that Offset [2]<0, the electronic device 100 may determine, based on Offset [2]<0, that offset [2]×offset [0]≥0 does not hold, that is, a change occurs between the states of the hands in the M-th frame of image and the initial image frame. In this case, the electronic device 100 further determines whether offset [2]≥L holds. If offset [2]≥L holds, the electronic device 100 determines that a hand flip gesture is recognized; on the contrary, the electronic device 100 determines that no hand flip gesture is recognized.

In this case, Offset [2]=18<L, that is, offset [2]≥L does not hold. Therefore, the electronic device 100 may determine that no hand flip gesture is recognized.

In this case, the electronic device 100 may continue to obtain the third frame of image after S0, that is, S3. Likewise, in this case, S3=3<90, that is, S3 is not the last frame of image. Therefore, the electronic device 100 may determine the gesture vector Offset [3] of S3 according to the processing method shown in S201 to S205. As shown in FIG. 15, in this case, Offset [3]<0. Therefore, offset [3]× offset [0]≥0 does not hold. It is assumed that, in this case, Offset [3]=28, that is, Offset [3]≥L holds. Therefore, the electronic device 100 may determine that a hand flip gesture is recognized.

In this way, the electronic device 100 may limit a palm flip angle in the hand flip gesture, to avoid recognizing a waving action unintentionally made by the user as a hand flip gesture, thereby improving accuracy of gesture recognition.

It can be understood that, in the process of determining the initial image frame in S101, when the electronic device 100 calculates the gesture vector offset [0] of the image frame including the hand (the palm or the back of the hand) after determining that the image frame is recognized, the electronic device 100 may also limit a length of the offset [0], to avoid determining any image frame with a hand as an initial image frame and increasing calculation costs of the electronic device 100.

In the embodiments of this application, the screen shown in FIG. 3C may be referred to as a first interface, the preview window in FIG. 3C may be referred to as a first preview window, the hand flip gesture shown in FIG. 1 may be referred to as a first gesture, the screen shown in FIG. 3D may be referred to as a second interface, and the preview window in FIG. 3D may be referred to as a second preview window. Alternatively, the screen shown in FIG. 3A may be referred to as a first interface, the preview window 101 in FIG. 3A may be referred to as a first preview window, the preview window 102 in FIG. 3A may be referred to as a third preview window, and the screen shown in FIG. 3B may be referred to as a third interface.

In FIG. 13, the hand image 83 in S0 may be referred to as a first hand image, and the hand image 84 in S1 may be referred to as a second hand image. With reference to FIG. 15, the offset [0] in S0 may be referred to as a first gesture vector, the offset [1] in S1 may be referred to as a second gesture vector, the offset [2] in S2 may be referred to as a second gesture vector, and the offset [3] in S3 may be referred to as a second gesture vector. A direction of the offset [0] in S0 may be referred to as first direction information, a direction of the offset [1] in S1 may be referred to as second direction information, a direction of the offset [2] in S2 may be referred to as second direction information, and a direction of the offset [3] in S3 may be referred to as second direction information.

The X axis may be referred to as a first coordinate axis. X0 [1] may be referred to as a first coordinate, X0 [18] may be referred to as a second coordinate, X1 [1] may be referred to as a third coordinate, X1 [18] may be referred to as a fourth coordinate, X2 [1] may be referred to as a third coordinate, X2 [18] may be referred to as a fourth coordinate, X3 [1] may be referred to as a third coordinate, and X3 [18] may be referred to as a fourth coordinate.

The hand image 84 in FIG. 14 may be referred to as a region in which a second hand image is located, the hand image 83 in FIG. 14 may be referred to as a region in which a first hand image is located, a region in which the face image 81 is located in FIG. 9B may be referred to as a region in which a face is located in a second image, and a region in which the body image 82 is located in FIG. 9B may be referred to as a first region.

The IoU threshold 0.6 in FIG. 12 may be referred to as a first threshold, and the minimum threshold of the gesture vector offset in S207 may be referred to as a second threshold.

The control 115 in FIG. 2A may be referred to as a first control.

Figure 16:
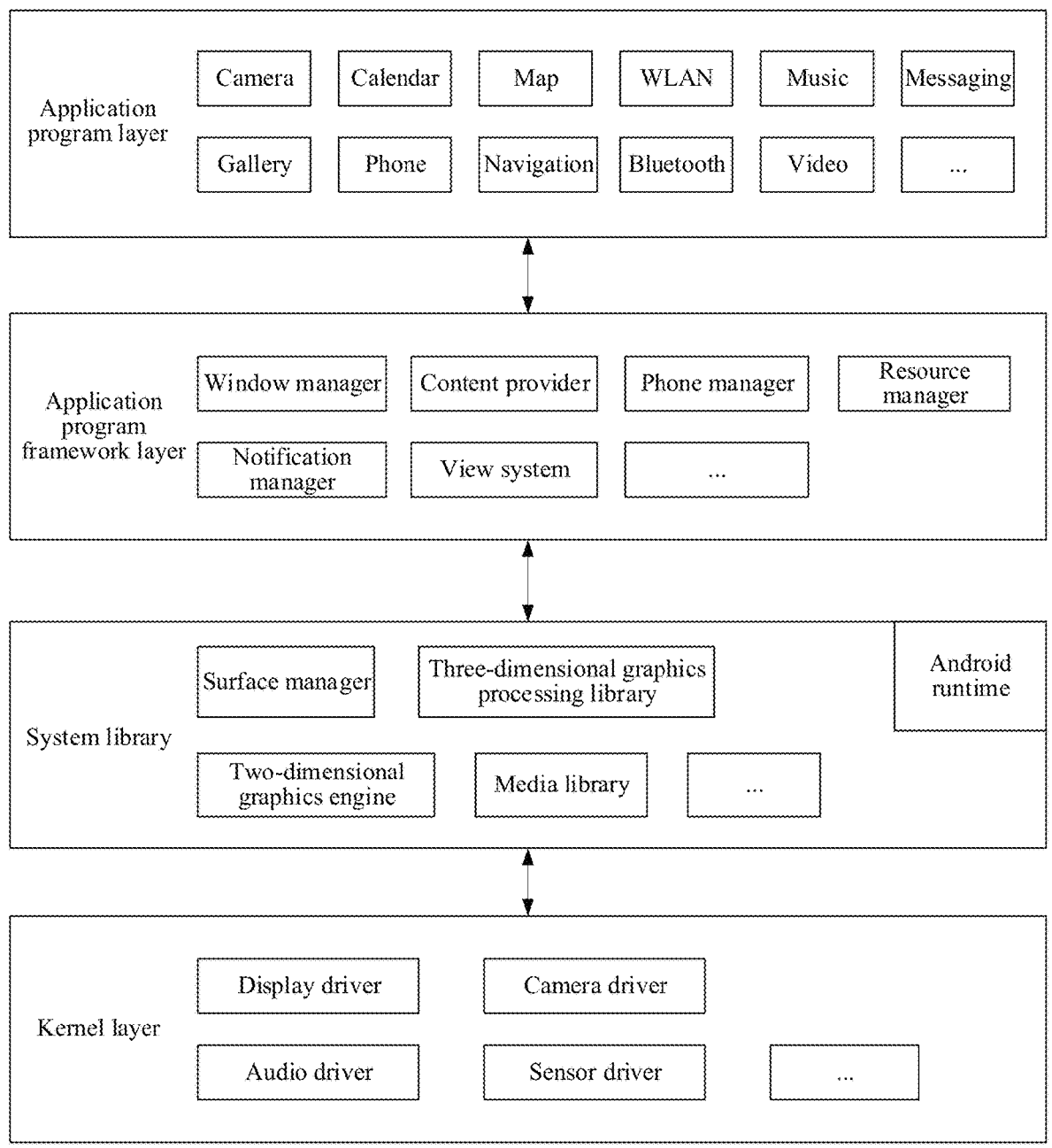
FIG. 16 is a diagram of a software architecture of an electronic device according to an embodiment of this application.

A hierarchical architecture, an event-driven architecture, a micro-core architecture, a micro-service architecture, or a cloud architecture may be used for a software system of the electronic device 100. In this embodiment of the present invention, an Android system with a hierarchical architecture is used as an example to describe a software structure of the electronic device 100. FIG. 16 is an example diagram of a software architecture of the electronic device 100.

A hierarchical architecture divides software into several layers. Each layer has a clear role and responsibility. Layers communicate with each other through a software interface. In some embodiments, an Android system is divided into four layers from top to bottom: an application program layer, an application program framework layer, Android runtime (Android runtime) and a system library, and a kernel layer.

The application program layer may include a series of application program packages. As shown in FIG. 11, an application program package may include application programs such as a camera, a gallery, a calendar, a phone, a map, navigation, a WLAN, Bluetooth, music, a video, and messaging.

A method for recognizing a waving or swiping gesture of a user by using a motion track in the embodiments of this application may be implemented in the camera application. The user interfaces shown in FIG. 2A and FIG. 2B, FIG. 3A to FIG. 3F, FIG. 4A to FIG. 4F, FIG. 5A to FIG. 5F, and FIG. 6A and FIG. 6B may be application screens provided by the camera application.

The application program framework layer provides an application programming interface (application programming interface, API) and an application programming framework for an application program at the application program layer. The application program framework layer includes some predefined functions. As shown in FIG. 11, the application program framework layer may include a window manager, a content provider, a view system, a phone manager, a resource manager, a notification manager, and the like.

The window manager is configured to manage a window program. The window manager may obtain a size of a display, determine whether there is a status bar, lock the screen, take a screenshot, and the like. In the embodiments of this application, displaying, by the electronic device 100, the user interfaces shown in FIG. 2A and FIG. 2B, FIG. 3A to FIG. 3F, FIG. 4A to FIG. 4F, FIG. 5A to FIG. 5F, and FIG. 6A and FIG. 6B depends on the window manager.

The content provider is configured to store and obtain data, and make the data accessible to an application program. In the embodiments of this application, video data, audio data, and other data generated through collection by the camera may be cached in the content provider.

The view system includes a visual control, for example, a word display control or a picture display control. The view system may be configured to build an application program. A display screen may include one or more views. In the embodiments of this application, the view system may include controls on the user interfaces shown in FIG. 2A and FIG. 2B, FIG. 3A to FIG. 3F, FIG. 4A to FIG. 4F, FIG. 5A to FIG. 5F, and FIG. 6A and FIG. 6B, and the view system further records layouts including screen elements such as the controls and graphics. By using the foregoing control and graphics resources and the control and graphics layout resources, the electronic device 100 may display the user interfaces shown in FIG. 2A and FIG. 2B, FIG. 3A to FIG. 3F, FIG. 4A to FIG. 4F, FIG. 5A to FIG. 5F, and FIG. 6A and FIG. 6B.

The resource manager provides various resources for an application program, for example, a localized string, an icon, a picture, a layout file, and a video file. When the camera application is run, the resource manager may provide videos, audio, a layout file of the camera application, and the like for the camera application.

The Android runtime includes a core library and a virtual machine. The Android runtime is responsible for scheduling and managing the Android system. The core library includes two parts: a performance function that needs to be invoked for Java language, and an Android core library. The application program layer and the application program framework layer run in the virtual machine.

The system library may include a plurality of functional modules, for example, a surface manager (surface manager), a media library (Media Libraries), a 3D graphics processing library (for example, OpenGL ES), and a 2D graphics engine (for example, SGL).

The surface manager is configured to manage a display subsystem, and provide 2D and 3D layer fusion for a plurality of application programs. Displaying, by the electronic device 100, the user interfaces shown in FIG. 2A and FIG. 2B, FIG. 3A to FIG. 3F, FIG. 4A to FIG. 4F, FIG. 5A to FIG. 5F, and FIG. 6A and FIG. 6B depends on a 2D and 3D layer fusion capability provided by the surface manager.

The media library supports playback and recording in a plurality of common audio and video formats, static image files, and the like. The media library may support a plurality of audio and video encoding formats, for example, MPEG4, H.264, MP3, AAC, AMR, JPG, and PNG. In the embodiments of this application, when recording a video in a dual-scene mode, the electronic device 100 may encode the video by using an audio and video encoding capability provided by the media library, and save the video.

The 3D graphics processing library is configured to implement 3D graphics drawing, image rendering, synthesis, layer processing, and the like. The 2D graphics engine is a drawing engine for 2D drawing. Invoking, by the electronic device 100, framework-layer interfaces such as the window manager and the view system to implement a function of displaying the user interfaces shown in FIG. 2A and FIG. 2B, FIG. 3A to FIG. 3F, FIG. 4A to FIG. 4F, FIG. 5A to FIG. 5F, and FIG. 6A and FIG. 6B depends on graphics drawing and rendering services provided by the 3D graphics processing library and the 2D graphics engine.

The kernel layer is a layer between hardware and software. The kernel layer includes at least a display driver, a camera driver, an audio driver, and a sensor driver.

The display driver may be used to drive the display to display the layout file of camera application, the video, the control, and the like that are provided by the resource manager, to display the user interfaces of the camera application shown in FIG. 2A and FIG. 2B, FIG. 3A to FIG. 3F, FIG. 4A to FIG. 4F, FIG. 5A to FIG. 5F, and FIG. 6A and FIG. 6B. The camera driver may be used to drive the camera to collect an image and convert an optical signal into an electrical signal, so as to generate image and video streams.

Figure 17:
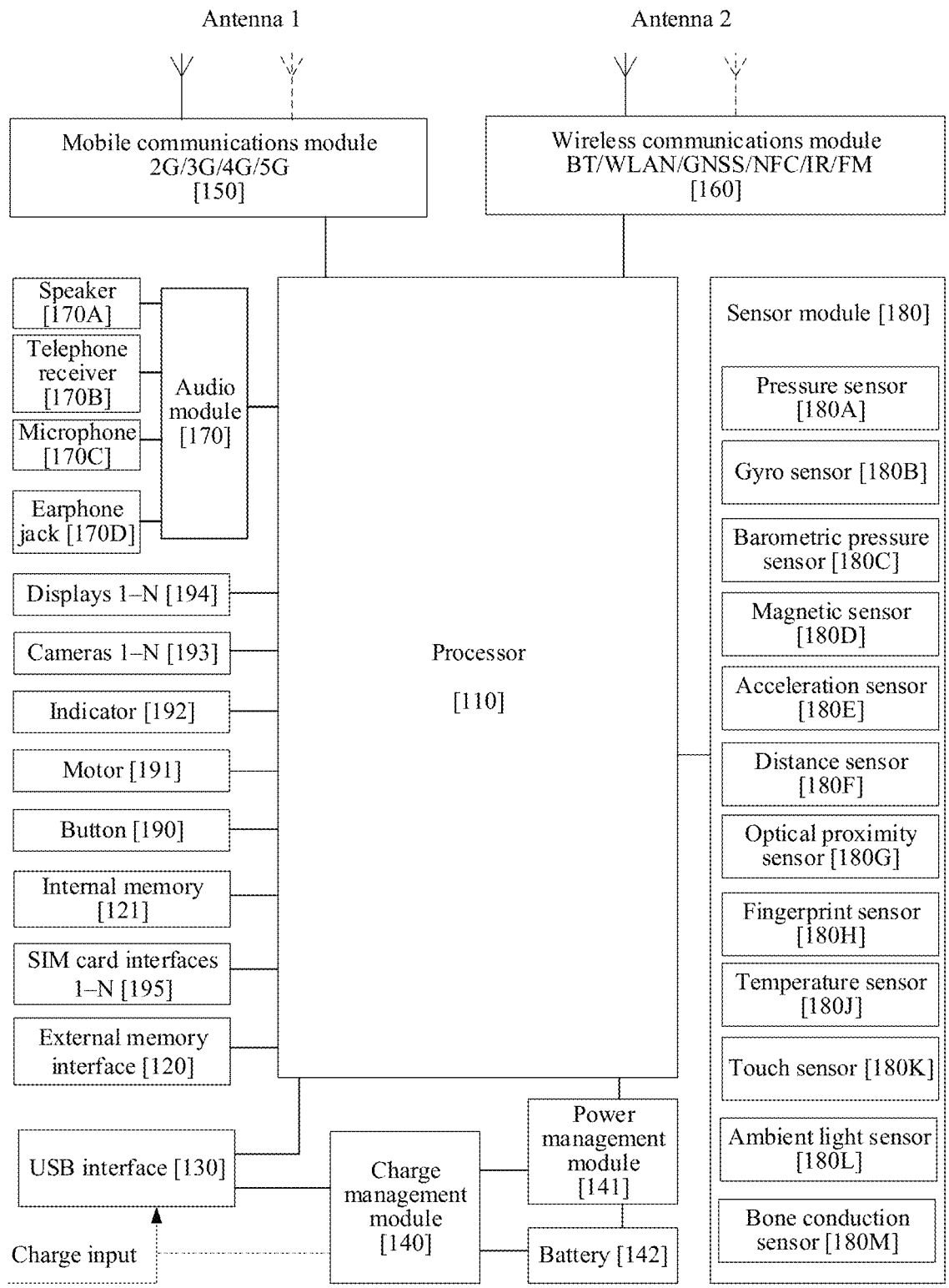
FIG. 17 is a diagram of a hardware architecture of an electronic device according to an embodiment of this application.

FIG. 17 is an example diagram of a hardware architecture of the electronic device 100.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may generate an operation control signal based on instruction operation code and a time sequence signal, to control obtaining of instructions and execution of the instruction.

A memory may be further disposed in the processor 110 to store instructions and data. In some embodiments, the memory in the processor 110 is a cache. The memory may store instructions or data just used or cyclically used by the processor 110. If the processor 110 needs to use the instructions or the data again, the processor 110 may directly invoke the instruction or the data from the memory. This avoids repeated access and reduces a waiting time of the processor 110, thereby improving system efficiency.

It can be understood that an interface connection relationship between the modules shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display 194 includes a display panel. The display panel may be a liquid crystal display (liquid crystal display, LCD). Alternatively, the display panel may be manufactured using an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini LED, a micro LED, a micro OLED, a quantum dot light-emitting diode (quantum dot light emitting diodes, QLED), or the like. In some embodiments, the electronic device may include one or N displays 194, where N is a positive integer greater than 1.

In the embodiments of this application, displaying, by the electronic device 100, the user interfaces shown in FIG. 2A and FIG. 2B, FIG. 3A to FIG. 3F, FIG. 4A to FIG. 4F, FIG. 5A to FIG. 5F, and FIG. 6A and FIG. 6B depends on a display function provided by the GPU, the display 194, the application processor, and the like.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to a naked eye. The ISP may further optimize noise, luminance, and complexion of the image based on an algorithm. The ISP may further optimize parameters such as exposure and color temperature of a photographing scenario. In some embodiments, the ISP may be disposed in the camera 193.

The camera 193 is configured to capture a static image or a video. An optical image is generated for an object by the lens, and the optical image is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG)1, MPEG2, MPEG3, and MPEG4.

In the embodiments of this application, a process of displaying an image collected by a camera and generating a video by the electronic device 100 on the user interfaces shown in FIG. 2A and FIG. 2B, FIG. 3A to FIG. 3F, FIG. 4A to FIG. 4F, FIG. 5A to FIG. 5F, and FIG. 6A and FIG. 6B depends on a photographing function provided by the ISP, the camera 193, the video codec, the GPU, the display 194, and the application processor.

The touch sensor 180K is also referred to as a "touch device". The touch sensor 180K may be disposed in the display 194, and the touch sensor 180K and the display 194 form a touchscreen, which is also referred to as a "touch control screen". The touch sensor 180K is configured to detect a touch operation acting on or near the touch sensor. The touch sensor may transmit the detected touch operation to the application processor to determine a type of a touch event. Visual output related to the touch operation may be provided by the display 194. In some other embodiments, the touch sensor 180K may be alternatively disposed on a surface of the electronic device 100, in a position different from that of the display 194.

In the embodiments of this application, the electronic device 100 may determine, through touch detection provided by the touch sensor 180K, whether a user operation acting on the control 111, the control 112, or the like in FIG. 2A is detected.

The term "user interface (user interface, UI)" in the specification, claims, and accompanying drawings of this application is a medium interface for interaction and information exchange between an application program or an operating system and a user. The user interface implements conversion between an internal form of information and a form acceptable to the user. A user interface of an application program is source code written in a specific computer language such as Java or extensible markup language (extensible markup language, XML). The interface source code is parsed and rendered on a terminal device, and finally presented as user-recognizable content, for example, a control such as a picture, a text, or a button. A control (control) is also referred to as a widget (widget), and is a basic element of a user interface. Typical controls include a toolbar (toolbar), a menu bar (menu bar), a text box (text box), a button (button), a scrollbar (scrollbar), a picture, and a text. Attributes and content of controls on a screen are defined by tags or nodes. For example, in XML, controls included in a screen are defined by nodes such as <Textview>, <ImgView>, and <VideoView>. One node corresponds to one control or one attribute on a screen. After parsing and rendering, the node is presented as user-visible content. In addition, screens of many application programs, such as a hybrid application (hybrid application), usually further include web pages. A web page, also referred to as a page, may be understood as a special control embedded in an application program screen. A web page is source code written in a specific computer language, such as hypertext markup language (hypertext markup language, GTML), cascading style sheets (cascading style sheets, CSS), or JavaScript (JavaScript, JS). The web page source code may be loaded and displayed as user-recognizable content by a browser or a web page display component with a function similar to that of the browser. Specific content included in the web page is also defined by tags or nodes in the web page source code. For example, in GTML, elements and attributes of a web page are defined by <p>, <img>, <video>, and <canvas>.

A common representation of the user interface is a graphic user interface (graphic user interface, GUI), which is a graphically displayed user interface related to computer operations. The GUI may be a screen element such as an icon, a window, or a control displayed on a display of an electronic device. The control may include a visual screen element such as an icon, a button, a menu, a tab, a text box, a dialog box, a status bar, a navigation bar, or a widget.

As used in the specification and the appended claims of this application, singular expressions "a", "an", "the", "the foregoing", and "this" are also intended to include plural expressions, unless otherwise expressly specified in the context. It should be further understood that the term "and/or" used in this application means including any or all possible combinations of one or more of listed items. As used in the foregoing embodiments, the term "when" may be interpreted as a meaning of "if", "after", "in response to determining", or "in response to detecting" based on the context. Similarly, based on the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, all or some of the processes or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line) or a wireless manner (for example, infrared, radio, or microwave). The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art can understand that all or some of the processes of the methods in the foregoing embodiments may be implemented by a computer program instructing related hardware. The program may be stored in a computer-readable storage medium. When the program is executed, the processes in the foregoing method embodiments may be included. The storage medium includes any medium that can store computer program code, for example, a ROM, a random access memory RAM, a magnetic disk, or an optical disc.

What is claimed is:

1. A photographing method, applied to an electronic device, wherein the electronic device comprises a first camera and a second camera, and the method comprises:
    displaying a first interface, wherein the first interface comprises a first preview window, and the first preview window displays an image collected by the first camera in real time;
    detecting a first gesture of a user; and
    displaying a second interface in response to the first gesture, wherein the second interface comprises a second preview window, and the second preview window displays an image collected by the second camera in real time, wherein
    the detecting a first gesture of a user comprises:
    collecting a first image, wherein the first image is an image collected by the first camera or the second camera, and the first image comprises a first hand image;
    determining a first gesture vector, wherein the first gesture vector is determined based on positions of a first feature point and a second feature point in the first hand image;
    collecting a second image, wherein the second image is an image collected by the first camera or the second camera, and the second image comprises a second hand image;
    determining a second gesture vector, wherein the second gesture vector is determined based on positions of the first feature point and the second feature point in the second hand image; and
    determining the first gesture based on the first gesture vector and the second gesture vector.

2. The method according to claim 1, wherein the first gesture vector comprises first direction information, the second gesture vector comprises second direction information, both the first direction information and the second direction information are used to identify a hand state, and the determining the first gesture based on the first gesture vector and the second gesture vector comprises:
    determining the first gesture based on the first direction information and the second direction information.

3. The method according to claim 2, wherein the determining the first gesture based on the first direction information and the second direction information comprises: when the first direction information and the second direction information are different, determining that the first gesture is a hand flip gesture.

4. The method according to claim 1, wherein the first interface further comprises a third preview window, and the third preview window displays an image collected by the second camera in real time; and
    a third interface is displayed in response to the first gesture, wherein on the third interface, the first preview window displays the image collected by the second camera in real time, and the third preview window displays the image collected by the first camera in real time.

5. The method according to claim 1, the determining a first gesture vector comprises:
    recognizing the first feature point and the second feature point in the first hand image; and
    determining the first gesture vector based on positions of the first feature point and the second feature point on a first coordinate axis, wherein the first coordinate axis is parallel to a ground; and
    the determining a second gesture vector comprises:
    recognizing the first feature point and the second feature point in the second hand image; and
    determining the second gesture vector based on positions of the first feature point and the second feature point on the first coordinate axis.

6. The method according to claim 5, wherein
    first direction information of the first gesture vector is a direction of a first coordinate pointing to a second coordinate, wherein the first coordinate is a projected point of the first feature point in the first hand image on the first coordinate axis, and the second coordinate is a projected point of the second feature point in the first hand image on the first coordinate axis; and
    second direction information of the second gesture vector is a direction of a third coordinate pointing to a fourth coordinate, wherein the third coordinate is a projected point of the first feature point in the second hand image on the first coordinate axis, and the fourth coordinate is a projected point of the second feature point in the second hand image on the first coordinate axis.

7. The method according to claim 5, wherein the recognizing a first feature point and a second feature point in the first hand image comprises:
    recognizing a first quantity of bone points of a palm in the first hand image; and
    determining the first feature point and the second feature point based on the first quantity of bone points, wherein the first feature point and the second feature point are respectively located on two sides of a central axis of the palm in the first hand image.

8. The method according to claim 7, wherein the determining the first feature point and the second feature point based on the first quantity of bone points comprises:
    selecting two bone points from the first quantity of bone points as the first feature point and the second feature point.

9. The method according to claim 7, wherein the determining the first feature point and the second feature point based on the first quantity of bone points comprises:
selecting a plurality of bone points from the first quantity of bone points, and calculating the first feature point and the second feature point by using the plurality of bone points.

10. The method according to claim 7, wherein the first feature point is a bone point at the top of a thumb, and the second feature point is a bone point at the top of a little finger.

11. The method according to claim 1, wherein before the determining a second gesture vector, the method further comprises:
recognizing a region in which the second hand image is located in the second image; and
determining an intersection over union (IoU) between the region in which the second hand image is located in the second image and a region in which the first hand image is located in the first image; and
the determining a second gesture vector comprises:
determining the second gesture vector of the second hand image in the second image when the IoU meets a first threshold.

12. The method according to claim 10, wherein the determining an intersection over union (IoU) between regions in which hands are located in the second image and the first image comprises:
determining an intersection and a union between the region in which the second hand image is located in the second image and the region in which the first hand image is located in the first image, wherein
the IoU is a ratio of the intersection to the union.

13. The method according to claim 10, wherein the recognizing a region in which the second hand image is located in the second image comprises:
determining a region in which a face is located in the second image;
determining a first region based on the region in which the face is located, wherein the first region comprises and is larger than the region in which the face is located, and the first region is smaller than the second image; and
recognizing a region in which the hand is located in the first region, and determining that the region in which the hand is located is the region in which the second hand image is located.

14. The method according to claim 3, wherein the method further comprises:
determining that a length of the second gesture vector meets a second threshold; and
the when the first direction information and the second direction information are different, determining that the first gesture is a hand flip gesture comprises: when the first direction information and the second direction information are different and the length of the second gesture vector meets the second threshold, determining that the first gesture is a hand flip gesture.

15. The method according to claim 1, wherein before the detecting a first gesture of a user, the method further comprises:
detecting a first operation; and
starting photographing in response to the first operation.

16. The method according to claim 15, wherein the first operation comprises: an operation acting on a first control, wherein the first control is displayed on the first interface; or an operation of recognizing that the user has made a second gesture, wherein the second gesture corresponds to the first control.

17. The method according to claim 15, wherein
the first camera is a front-facing camera, and the second camera is a rear-facing camera; or
the first camera is a front-facing camera, and the second camera is a front-facing camera; or
the first camera is a rear-facing camera, and the second camera is a rear-facing camera.

18. An electronic device, comprising one or more processors and one or more memories coupled to the one or more processors to store computer program code having computer instructions, which when executed by the one or more processors, cause the one or more processors to perform a method, the method comprising:
displaying a first interface, wherein the first interface comprises a first preview window, and the first preview window displays an image collected by a first camera in real time;
detecting a first gesture of a user; and
displaying a second interface in response to the first gesture, wherein the second interface comprises a second preview window, and the second preview window displays an image collected by a second camera in real time, wherein
the detecting a first gesture of a user comprises:
collecting a first image, wherein the first image is an image collected by the first camera or the second camera, and the first image comprises a first hand image;
determining a first gesture vector, wherein the first gesture vector is determined based on positions of a first feature point and a second feature point in the first hand image;
collecting a second image, wherein the second image is an image collected by the first camera or the second camera, and the second image comprises a second hand image;
determining a second gesture vector, wherein the second gesture vector is determined based on positions of the first feature point and the second feature point in the second hand image; and
determining the first gesture based on the first gesture vector and the second gesture vector.

19. A non-transitory computer-readable storage medium, comprising instructions, wherein when the instructions are run on an electronic device, cause the electronic device to perform a method, the method comprising:
displaying a first interface, wherein the first interface comprises a first preview window, and the first preview window displays an image collected by a first camera in real time;
detecting a first gesture of a user; and
displaying a second interface in response to the first gesture, wherein the second interface comprises a second preview window, and the second preview window displays an image collected by a second camera in real time, wherein
the detecting a first gesture of a user comprises:
collecting a first image, wherein the first image is an image collected by the first camera or the second camera, and the first image comprises a first hand image;
determining a first gesture vector, wherein the first gesture vector is determined based on positions of a first feature point and a second feature point in the first hand image;

collecting a second image, wherein the second image is an image collected by the first camera or the second camera, and the second image comprises a second hand image;

determining a second gesture vector, wherein the second gesture vector is determined based on positions of the first feature point and the second feature point in the second hand image; and determining the first gesture based on the first gesture vector and the second gesture vector.

* * * * *